US010276125B2

(12) United States Patent
Chrobak et al.

(10) Patent No.: US 10,276,125 B2
(45) Date of Patent: Apr. 30, 2019

(54) METHOD OF AND APPARATUS FOR CONTROLLING OVERRUN WHEN WRITING DATA FROM A DISPLAY CONTROLLER TO MEMORY

(71) Applicant: ARM Limited, Cambridge (GB)

(72) Inventors: Piotr Tadeusz Chrobak, Cambridge (GB); Michal Karol Bogusz, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/281,451

(22) Filed: Sep. 30, 2016

(65) Prior Publication Data
US 2018/0095677 A1    Apr. 5, 2018

(51) Int. Cl.
| | |
|---|---|
| G06F 5/14 | (2006.01) |
| G06F 5/06 | (2006.01) |
| G09G 5/393 | (2006.01) |
| G09G 5/00 | (2006.01) |
| G06F 3/14 | (2006.01) |
| G09G 5/14 | (2006.01) |
| G09G 5/397 | (2006.01) |

(52) U.S. Cl.
CPC .............. *G09G 5/001* (2013.01); *G06F 3/14* (2013.01); *G06F 5/06* (2013.01); *G06F 5/14* (2013.01); *G09G 5/14* (2013.01); *G09G 5/393* (2013.01); *G09G 5/397* (2013.01); *G09G 2340/12* (2013.01)

(58) Field of Classification Search
None
See application file for complete search history.

(56) References Cited

U.S. PATENT DOCUMENTS 5,475,807 A  * 12/1995 Yoshida .................. G06K 15/02
                                                      345/170
6,359,625 B1    3/2002 Perego
(Continued)

FOREIGN PATENT DOCUMENTS

| GB | 2474114 | 4/2011 | |
| GB | 2524359 A * | 9/2015 | ............. G09G 5/363 |
| WO | WO 2015/087078 | 6/2015 | |

OTHER PUBLICATIONS

PCT International Search Report, dated Jul. 10, 2015, PCT Patent Application PCT/GB2014/053668.

*Primary Examiner* — Joni Richer
(74) *Attorney, Agent, or Firm* — Vierra Magen Marcus LLP

(57) ABSTRACT

In a display controller, output surface data from a composition processing stage 22 is received by and stored in a local latency hiding buffer 40 of a memory write subsystem 31 before being written out to an external memory. The local buffer 40 of the memory write subsystem 31 signals when it is "full", and in response thereto the inputting of output surface data to the local buffer 40 is stopped until the current line of the output surface has been finished, and then started again when the next line of the output surface begins. The writing of any data for the line of the output surface that was being written to the local buffer 40 that is already present in the local buffer 40 and not yet written to the external memory is also skipped, and it is recorded that the output surface line in question is not properly stored in the external memory.

21 Claims, 9 Drawing Sheets

(56) References Cited

U.S. PATENT DOCUMENTS

| | | | |
|---|---|---|---|
| 7,176,928 B1* | 2/2007 | Sendrovitz | G06F 5/06 345/520 |
| 2001/0020951 A1* | 9/2001 | Onagawa | G06F 3/14 345/696 |
| 2007/0132771 A1* | 6/2007 | Peer | G06F 3/14 345/545 |
| 2008/0186319 A1 | 8/2008 | Boner | |
| 2011/0242611 A1* | 10/2011 | Nozaki | H04N 1/0473 358/437 |

* cited by examiner

METHOD OF AND APPARATUS FOR CONTROLLING OVERRUN WHEN WRITING DATA FROM A DISPLAY CONTROLLER TO MEMORY

BACKGROUND

The technology described herein relates to data processing systems and in particular to display controllers for data processing systems.

FIG. 1 shows an exemplary data processing system that comprises a central processing unit (CPU) 7, a graphics processing unit (GPU) 2, a video codec 1, a display controller 30, and a memory controller 8. As shown in FIG. 1, these units communicate via an interconnect 9 and have access to off-chip memory 3.

In use of this system, the GPU 2, video codec 1 and/or CPU 7 will generate surfaces (images) to be displayed and store them, via the memory controller 8, in respective frame buffers in the off-chip memory 3. The display controller will then read those surfaces as input layers from the frame buffers in the off-chip memory 3 via the memory controller 8, process the input surfaces appropriately and send them to a display 4 for display.

FIG. 2 shows an exemplary data path for the input surfaces for display in the display controller 30. It is assumed in this example that the display controller 30 can take as inputs for a given output surface to be displayed, a plurality of input surfaces (layers), and includes, inter alia, a composition engine (stage) 22 that is able to compose one or more input surfaces (layers) e.g. generated by the GPU 2 and/or video codec 1) to provide a composited output frame for display.

As shown in FIG. 2, the display controller 30 includes a DMA (Direct Memory Access) read unit 20 that reads data of input surfaces to be displayed and provides that data appropriately to respective layer processing pipelines 21 that perform appropriate operations on the received input surfaces before they are provided to the display composition stage 22, where they are composited into the desired composited output surface for display.

The composited output surface (i.e. the frame that is to be displayed) is then subjected to display timing control 23 (e.g. the inclusion of appropriate horizontal and vertical blanking periods), and then provided to the display output interface of the display controller 30 for provision to the display 4 for display.

This process is performed for each frame that needs to be displayed, e.g. at a rate of 30 or 60 frames per second.

As such display processing is a real-time operation, the display controller 30 needs to deliver the pixel data to be displayed to the display 4 (to the display output) regularly, in accordance with the desired display refresh rate.

The Applicants have previously proposed in their UK Patent Application GB-A-2524359 an improved display controller that includes functionality to allow composited frames output by the composition stage 22 to be written back to memory, as well as being provided to a display for display.

FIG. 3 shows an exemplary data path for the composited output surface when being written back to memory by the display controller in display controller arrangements of the type proposed by the Applicants in their earlier UK patent application.

As shown in FIG. 3, the write-out unit 31 of the display controller includes a local buffer 40 and DMA (Direct Memory Access) logic 41. The composited output surface data from the display composition stage 22 is streamed (fed directly) to and buffered in the local buffer 40 of the write-out unit 31 as that data is being generated, and then written from the local buffer 40 to a frame buffer 33 in, e.g., external, memory, by the DMA write logic 41.

The local buffer 40 (which may, e.g., be in the form of a FIFO) provides "latency" buffering (latency "hiding") in the memory write-back path to allow for potential latency in writing the composited output surface data to the memory. This is desirable to allow, for example, for the fact that, as discussed above, the composited output surface will be being generated by the display composition stage 22 at a rate that is governed by the requirements of the display, whereas the rate at which the DMA write logic 41 of the write-out unit 31 will be able to write composited output surface data to the frame buffer 33 in memory will be governed by the rate at which that data can be written to the memory. There may therefore be a mismatch between the rate at which the data can be written out by the write-out unit 31 and the rate at which that data is provided to the write-out unit 31. The local, "latency-hiding", buffer 40, is present in order to allow for that.

The provision of functionality to allow composited frames output by the composition stage 22 of a display controller to be written back to memory facilitates a number of improved display controller operations.

For example, where the display controller is compositing plural input surfaces to provide an output surface for display, then the composited output surface can be written back to memory, and if the input surfaces have not changed (which can be a relatively common occurrence for certain content), then for the next frame to be displayed, the written-back composited output surface can simply be read in and displayed again, rather than having to read in and recompose the plural separate input surfaces, thereby providing savings in bandwidth and power when displaying the next frame or frames.

FIGS. 4 and 5 illustrate this operation and show a display controller 30 that additionally includes, as shown in those figures, a DMA write-out unit 31 that is operable to be able to write the output from the display composition stage 22 to a frame buffer 33 in the external memory 3.

FIG. 4 illustrates the operation where three input surfaces 34, 35 and 36 are read by the display controller 30 and processed to provide a composited output surface 37 which is both provided for display output and written by the DMA write-out unit 31 back to a frame buffer 33 in main memory 3.

FIG. 5 then shows the operation for the next frame, in the case where it is determined that the frame to be displayed has not changed (e.g. by identifying that the input surfaces and their desired composition has not changed). In this case, as shown in FIG. 5, the display controller 30 simply reads the already composited output surface 37 from the main memory 3 and provides that directly for display. In this case, as only one input surface is being read, there is a reduction in the memory bandwidth and processing required for that operation.

Also, as shown in FIG. 5, only one of the layer processing pipelines 21 needs to be active for processing the single, already composited, input surface (i.e. the already composited output frame 37 can be processed as a single layer by the display controller 30). This again provides further power and processing savings.

As well as using memory write-back of a composited frame to reduce the amount of processing that may be required when displaying a sequence of composited frames as shown in FIGS. 4 and 5, the memory write-back operation of the display controller 30 can also be used for other purposes.

For example, the memory write-back operation can be useful in the situation where plural displays are provided and used to display the same output surface, e.g. where an output surface to be displayed on the data processing system's local display is also to be displayed on ("cloned" to) a second, e.g. external, display. It is often the case in such arrangements that the external display will require and use a different resolution and/or aspect ratio to the local display, and so, typically, two separate output surfaces for display would be generated and processed by respective display controllers and/or display processing cores, one for each display.

However, in arrangements where the display controller has memory write-back capability, then a first display controller may be operated to generate the image for display, and output it, e.g., to the local display, together with writing the generated output surface to memory. The output surface stored in memory may then be read by a second display controller or display processing core for display on the second, e.g. external, display device. This will again reduce the amount of processing and memory bandwidth required for providing the output image on the second display device.

This arrangement can also reduce the processing required where a frame to be displayed is sent to an external display via wireless transmission. In this case, again, the composited output frame can be written back to memory and read therefrom for processing, e.g. by a video encoder, for wireless transmission, rather than, e.g., having to wirelessly transmit each respective input surface to a display controller for the external display for those surfaces then to be processed and composited by that display controller.

The Applicants believe that there remains scope for improvements to the operation of display controllers that include functionality to write output surfaces back to memory, such as display controllers of the form described in the Applicant's earlier UK Patent Application GB-A-2524359.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
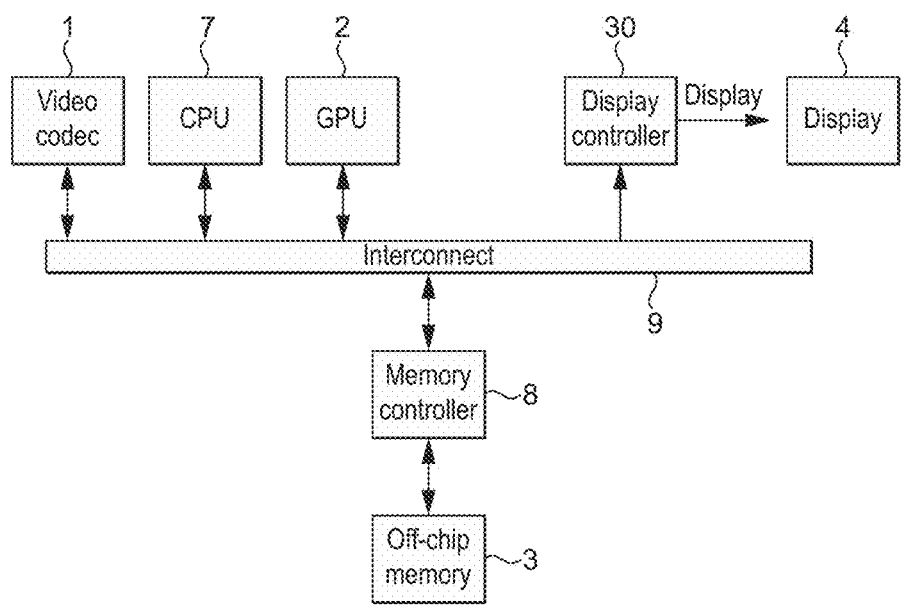
FIG. 1 shows an exemplary data processing system.
Figure 2:
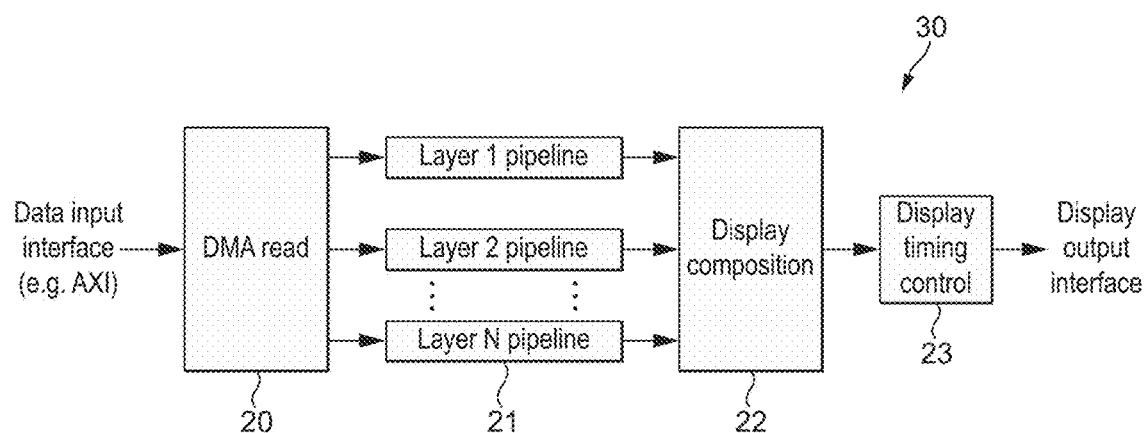
FIG. 2 shows schematically the data-flow in a display controller when processing input surfaces for display.
Figure 3:
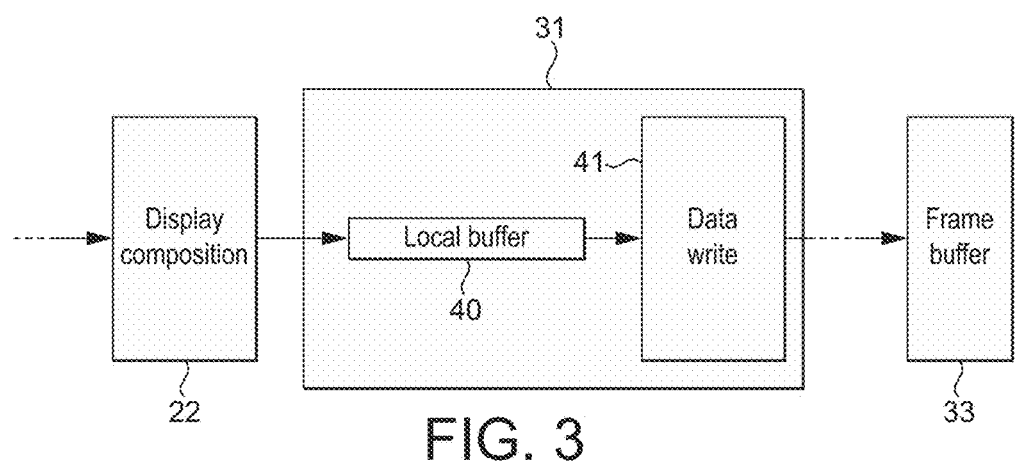
FIG. 3 shows schematically the data-flow in a display controller when writing an output surface to memory.

A first embodiment of the technology described herein comprises a method of operating a display controller of a data processing system, the display controller comprising:

an input stage operable to read at least one input surface;

a processing stage operable to process one or more read input surfaces to generate an output surface;

an output stage operable to provide an output surface for display to a display; and a write-out stage operable to write an output surface being generated by the processing stage to external memory;

wherein the write-out stage comprises a local buffer operable to receive and store data for an output surface to be written to external memory from the processing stage, and is operable to write data of an output surface to be written to external memory from the local buffer of the write-out stage to external memory;

the method comprising:

when writing an output surface being generated by the processing stage to external memory using the write-out stage:

determining whether the local buffer of the write-out stage has capacity to receive data of the output surface from the processing stage; and when it is determined that the local buffer of the write-out stage does not have capacity to receive data of the output surface from the processing stage, stopping the inputting of data for the output surface to the local buffer of the write-out stage, and re-starting the inputting of data of the output surface to the local buffer of the write-out stage at the start of a next region of the output surface.

A second embodiment of the technology described herein comprises a display controller for a data processing system, the display controller comprising:

an input stage operable to read at least one input surface;

a processing stage operable to process one or more read input surfaces to generate an output surface;

an output stage operable to provide an output surface for display to a display; and a write-out stage operable to write an output surface being generated by the processing stage to external memory;

wherein the write-out stage comprises a local buffer operable to receive and store data for an output surface to be written to external memory from the processing stage, and is operable to write data of an output surface to be written to external memory from the local buffer of the write-out stage to external memory;

the display controller further comprising processing circuitry configured to, when the display controller is writing an output surface being generated by the processing stage to external memory using the write-out stage:

determine whether the local buffer of the write-out stage has capacity to receive data of the output surface from the processing stage; and when it is determined that the local buffer of the write-out stage does not have capacity to receive data of the output surface from the processing stage, stop the inputting of data for the output surface to the local buffer of the write-out stage, and re-start the inputting of data of the output surface to the local buffer of the write-out stage at the start of a next region of the output surface.

The technology described herein relates to a display controller operation, and in particular to the operation of display controller when writing back an output surface to external memory, e.g. for use in one of the manners discussed above.

The Applicants have recognised in this regard that because display processing is a "real-time" operation, that is tied to and must meet the data requirements of the display (e.g. 30 or 60 frames per second), the data of output surfaces to be written back to memory will accordingly be generated and required to be written back to memory at a corresponding rate (as the generation and provision of the output surface data must be matched to the display's requirements, rather than the capabilities of the write-back stage).

While it should normally be the case that the memory write-back system should be able to transfer data to the external memory at a rate that is able to "keep up" with the rate of generation of the output surface data for the display, the Applicants have recognised that there can be situations where the write-back operation may not be able to write the data from the local buffer of the write-out stage to external memory at the rate at which the data is being generated. In this case, there may not be capacity in the local buffer of the write-out stage to store newly generated output surface data, as the local buffer is not being "emptied" of data to external memory fast enough. Such a situation can be thought of as being an "overrun" in the local buffer of the write-out stage (i.e. that the local buffer cannot accept any more input data).

Such "overrun" can occur, for example, because of latencies in writing the data from the local buffer to the external memory and/or there being long page table walks in the external memory system (page table walk is a potential cause of big latency). While it can be possible to design a memory system to reduce the risk of such "overrun", the Applicants believe that there can remain a risk of overrun occurring notwithstanding this.

The technology described herein addresses this by identifying whether the local buffer of the write-out stage of the display controller has capacity for new data (i.e. that "overrun" has or is likely to occur), and when such "overrun" is detected, then stopping the inputting of output surface data to the local buffer of the write-out stage. This will then have the effect of stopping filling up the local buffer, and allowing it to be "emptied", so that space for new data can be freed up in the local buffer, thereby removing the "overrun" situation.

Furthermore, in an "overrun" situation, the inputting (writing) of data to the local buffer then continues with (i.e. jumps to) data for a next region of the output surface (rather than, e.g., simply stopping completely).

The effect of this then is that when an "overrun" situation occurs, only a region of the output surface currently being written to the local buffer is affected by the overrun situation (as data for that region of the output surface will not be written to the local buffer (and correspondingly to external memory)), rather than, e.g., abandoning the writing of the output surface as a whole to external memory.

Furthermore, and as will be discussed further below, the Applicants believe that it may be relatively straightforward to satisfactorily compensate for any regions of an output surface that have not been written to external memory because of the operation in the manner of the technology described herein when using the output surface in question, e.g. for subsequent display.

The technology described herein accordingly can provide, as will be discussed in more detail below, an effective mechanism for addressing the issue of "overrun" in display controllers that are operable to write output surfaces to be displayed to external memory for subsequent use, e.g. in one of the manners discussed above.

The input stage of the display controller may comprise any suitable stage operable to read at least one input surface. It in an embodiment comprises a memory read sub-system operable to read data of input surfaces to be processed by the display controller. The memory read subsystem can function as desired and include any suitable and desired elements and components of such subsystems, such as, for example, and in an embodiment, appropriate local latency hiding buffers, a Direct Memory Access (DMA) read controller, etc.

Each input surface read by the display controller (that is used as an input layer by the display controller) may be any suitable and desired such surface, such as, and in an embodiment, an image, e.g. frame, for display.

The input surface or surfaces can be generated as desired. For example the one or more input surfaces may be generated by being appropriately rendered and stored into a memory (e.g. frame buffer) by a graphics processor. Additionally or alternatively, one or more input surfaces may be generated by being appropriately decoded and stored into a memory (e.g. frame buffer) by a video codec. Additionally or alternatively, one or more input surfaces may be generated by a digital camera image signal processor (ISP), or other image processor. The input surface or surfaces may be, e.g., for a game, a demo, a graphical user interface (GUI), a GUI with video data (e.g. a video frame with graphics "play back" and "pause" icons), etc.

In an embodiment, the input surface or surfaces are read from a memory in which the input surface or surfaces is stored. The memory may comprise any suitable memory and may be configured in any suitable and desired manner. For example, it may be a memory that is on-chip in the display controller or it may be an external memory. In an embodiment it is an external memory, such as a main memory of the overall data processing system. It may be dedicated memory for this purpose or it may be part of a memory that is used for other data as well. In an embodiment each input surface is stored in (and read from) a frame buffer.

The input surface or surfaces (layer or layers) may be used to provide an output surface (frame) for display in any suitable and desired manner. There may only be one input surface that is read and processed to generate a given output surface, but in an embodiment there are plural (two or more) input surfaces that are read and processed to generate the output surface. In embodiments, the output surface is composited from plural input surfaces.

The processing stage of the display controller may be operable to process an input surface or surfaces to generate an output surface in any desired and suitable manner.

In an embodiment, the processing stage is operable to compose (two or more) input surfaces to generate a composited output surface. Thus, in an embodiment, the processing stage comprises a composition stage operable to compose (two or more) surfaces to generate a composited output surface. The composition process can compose the surfaces to generate a composited output surface in any suitable and desired manner, for example by blending or otherwise combining the input surfaces to generate a composited output surface.

The processing stage may also or instead, and in an embodiment also, be operable to decode (e.g. decompress) an input surface, e.g. to generate one or more decoded (e.g. decompressed) input surfaces, to rotate an input surface, e.g. to generate one or more rotated input surfaces, and/or to scale (e.g. upscale and/or downscale) one or more surfaces, e.g. to generate one or more scaled surfaces. The "scaled" surface(s) may be an input surface or surfaces and/or the output surface.

In an embodiment, the processing stage is also or instead, and in an embodiment also, operable to encode (e.g. compress) one or more surfaces, e.g. to generate one or more compressed surfaces. This compression stage may be operable to compress any one, some or all of the input surface(s) and/or the (e.g. composited) output surface.

The processing stage may further comprise one or more layer pipelines operable to perform one or more processing operations on one or more input surfaces, as appropriate, e.g. before providing the one or more processed input surfaces to a scaling stage and/or composition stage, or otherwise. Where the display controller can handle plural input layers, there may be plural layer pipelines, such as a video layer pipeline or pipelines, a graphics layer pipeline, etc. These layer pipelines may be operable, for example, to provide pixel processing functions such as pixel unpacking, colour conversion, (inverse) gamma correction, and the like.

The display controller (e.g. processing stage) may also include a post-processing pipeline operable to perform one or more processing operations on one or more surfaces, e.g. to generate a post-processed surface. This post-processing may comprise, for example, colour conversion, dithering, and/or gamma correction.

Correspondingly, the processing of the input surface(s) to generate an output surface in an embodiment comprises one or more of and in an embodiment all of: decoding, rotation, composition, and scaling. The output surface may, e.g., also be subjected to post-processing, and/or encoding (e.g. compressing).

The output stage of the display controller of the technology described herein may be any suitable output stage operable to provide an output surface for display to a display, e.g. to cause the output surface for display to be displayed on the display. The output stage in an embodiment comprises a display processing pipeline that performs the necessary display processing operations on the output surface to be displayed. The output stage in an embodiment comprises appropriate timing control functionality (e.g. it is configured to send pixel data to the display with appropriate horizontal and vertical blanking periods), for the display.

The output stage is in an embodiment operable to receive the output surface for display before providing it to the display, and in an embodiment directly from within the display controller, and more in an embodiment directly from the processing stage, i.e. without the output surface for display being output from the display controller being stored in external memory.

The output surface should be and in an embodiment is an output surface generated by the processing stage. In an embodiment the output surface is an (optionally compressed) composited output surface generated by the processing stage, or an (optionally compressed) post-processed composited output surface. The output surface is in an embodiment an image for display.

The display that the display controller of the technology described herein is used with may be any suitable and desired display, such as for example, a screen. It may comprise the overall data processing system's (device's) local display (screen) and/or an external display. There may be more than one display output, if desired.

The write-out stage can be any suitable stage that can write an output surface to external memory. As well as the local buffer operable to receive and store data for an output surface to be written to external memory, the write-out stage in an embodiment comprises appropriate write-out logic, such as, and in an embodiment, a write controller, such as a Direct Memory Access (DMA) write controller.

The write-out stage is configured to receive the output surface data into its local buffer before writing it to external memory. The write-out stage in an embodiment receives the output surface data into its local buffer directly from within the display controller, and in an embodiment directly from the processing stage, i.e. without the output surface being output from the display controller or being stored in external memory.

The output surface written to the external memory should be and in an embodiment is an output surface generated by the processing stage. It may be a surface generated by any desired element (stage) of the overall processing stage. It may be a composited surface or a single (e.g. input) layer. In an embodiment, the output surface written to external memory is an (optionally compressed) composited output surface generated by the processing stage, or an (optionally compressed) scaled composited output surface generated by the processing stage.

As discussed above, the output surface is treated as if it is divided into respective regions for the purposes of the operation in the manner of the technology described herein.

The regions of the output surface that are considered in this regard can be any suitable and desired respective, smaller, regions (i.e. that do not comprise the whole output surface) that the output surface can be considered as being divided into for this purpose. This may depend, for example, upon how the output surface is being processed and generated and written to the local buffer and external memory, and, e.g., the capacity of the local buffer of the write-out stage.

For example, where the output surface is generated and processed in a raster line order as may typically be the case for output surfaces (images) to be displayed, then in an embodiment the regions that are considered in the technology described herein correspond to a line or some fraction of a line (e.g. half or quarter of a line) of the output surface.

In an embodiment, each region corresponds to a line of the output surface (i.e. a row of pixels (sampling positions) of the output surface). In this case therefore when an overrun situation is detected, the inputting of data for the current line of the output surface to the local buffer of the write-out stage will be stopped, and then the inputting (writing) of data of the output surface to the local buffer of the write-out stage will start at the beginning of (at the first pixel (sampling position) of), e.g., and in an embodiment, the next line of the output surface (and the data (pixels (sampling positions)) for the line (region) affected by overrun is discarded (lost)).

The output surface is in an embodiment considered to be divided into a plurality of equally sized and configured (shaped) regions for the purposes of the operation in the manner of the technology described herein, for example into a plurality of horizontal lines (with each region then corresponding to one of the lines).

It would also be possible for the output surface regions that are considered in the operation in the manner of the technology described herein to be something other than lines or parts of lines of the output surface, such as two-dimensional blocks (i.e. comprising a plurality of rows and a plurality of columns) of pixels (sampling positions) of the output surface, if desired. This may be appropriate where the output surface is generated and processed in a block-wise, rather than linear, form.

The external memory that the write-out stage writes the output surface to should be and is in an embodiment one or more memories external to the display controller. The external memory is in an embodiment provided as or on a separate chip (monolithic integrated circuit) to the display controller. The external memory in an embodiment comprises a main memory (e.g. that is shared with the Central Processing Unit (CPU)), of the overall data processing system. In an embodiment the output surface is written to a frame buffer in the external memory.

The local buffer of the write-out stage that receives and stores the data for an output surface before it's written to external memory can be any suitable and desired local buffer memory of or accessible to the write-out stage.

In an embodiment, the local buffer is a latency hiding buffer, e.g., and in an embodiment, that is able to store one or more lines of sampling position (pixel position) data for a surface. The local, e.g. latency hiding, buffer is in an embodiment a linear buffer, such as, and in an embodiment, a latency-hiding FIFO. The local buffer may also or instead comprise another, in an embodiment linear, buffer of the display controller (and that is accessible to the write-out stage), such as an output buffer.

The local buffer may receive and store the output surface data in any suitable and desired form, e.g. depending upon the form that that data is provided in from the processing stage and/or the form that that data will be written out to external memory in. For example, the processing stage may, and in an embodiment does, produce the output surface data in the form of pixels (sampling positions), but the output surface data may be written to external memory in the form of data words, e.g. each corresponding to (representing) a plurality of pixels (sampling positions) of the output surface. In such arrangements, the local buffer may store the output surface data in the form of pixels (sampling positions), or as data words, as desired.

The write-out stage may also, and does in an embodiment, comprise an appropriate data format conversion stage, e.g. a "pixel"-to-"data word" conversion stage, where the format of the output surface data produced by the processing stage differs to the format that the data will be written to external memory in. In such arrangements the data format conversion stage may come before or after the local buffer in the data flow path, as desired.

The local buffer in an embodiment has capacity to store data (in whatever format) for at least one region, e.g. line, of the output surface. In an embodiment, it has capacity to store more data than is required for a given single region of the output surface, such as for two or more than two regions of the output surface.

The various stages of the display controller may be implemented as desired, e.g. in the form of one or more fixed-function units (hardware) (circuitry) (i.e. that is dedicated to one or more functions that cannot be changed), or as one or more programmable processing stages, e.g. by means of programmable circuitry that can be programmed to perform the desired operation. There may be both fixed function and programmable stages.

One or more of the various stages of the display controller may be provided as separate circuit elements to one another. Additionally or alternatively, some or all of the stages may be at least partially formed of shared circuitry.

It would also be possible for the display controller to comprise, e.g., two display processing cores, each configured in the manner discussed above, if desired.

The occurrence of overrun (i.e. that the local buffer of the write-out stage does not (currently) have capacity for new data of the output surface being generated) can be determined (detected) in any suitable and desired manner. This may, e.g., and does in an embodiment, depend upon the way that the display controller operates.

In an embodiment, overrun is detected when the local, e.g. latency hiding, buffer in question is or becomes full, and/or contains more than a threshold amount of data (e.g. sampling point (pixel) positions and/or data words). In an embodiment, "overrun" is detected when the local, e.g. a latency hiding (or other linear), buffer of the write-out stage is or becomes full when there is new data ready at the input to the buffer.

In an embodiment, the spare data capacity of the local buffer is tracked, and a signal is sent (issued) when that buffer is full (has no spare capacity). Such a "full" signal is in an embodiment then interpreted as a determination that the local buffer of the write out stage does not currently have capacity to receive (further) data of the output surface being generated.

As discussed above, when overrun is detected, the inputting (writing) of data to the local buffer of the write-out stage is stopped. This can be achieved as desired. In an embodiment it is achieved by, e.g., an input controller of, the local buffer stopping accepting data for input to the local buffer until data for the next region of the output surface starts to be received for input to the local buffer. The remaining data for the region of output surface that was affected by overrun will accordingly be discarded (it is not written to the local buffer). A count of the "rejected" (discarded) input data entries (e.g. pixels/samples) may be maintained to identify when the next region starts (so that data can be accepted into the local buffer again).

Stopping the writing of data to the local buffer when overrun is detected will also have the effect that some or all of the data for the region of the output surface that was being written to the local buffer when the overrun occurred will not be written to the local buffer (and thus is discarded). Correspondingly therefore, some or all of the data for the region of the output surface that was being written to the local buffer when the overrun situation arose (event occurred) will never be present in the local buffer (will be discarded/lost), and so cannot be written out to the external memory from the local buffer.

In an embodiment therefore, when an overrun situation is detected, as well as stopping the inputting of data for the output surface to the local buffer of the write-out stage, the writing of data for the region of the output surface that was being written to the local buffer when the overrun situation was detected is also stopped or omitted (depending upon whether the writing of data for that output surface region from the local memory of the write-out stage to the external memory had already begun when the overrun situation occurred—this may depend upon the capacity of the local buffer, and whether, for example, it is able to store sufficient data such that one output surface region may be being written from the local memory to the external memory while another region of the output surface is being written to the local memory from the processing stage).

Thus, in an embodiment, when an overrun situation occurs, the method of the technology described herein comprises (and the write out stage of the display controller is further configured to) not writing any further data for the region of the output surface that was being input to the local buffer of the write-out stage when the overrun event occurred from the local buffer to the external memory, and re-starting the writing of data from the local buffer of the write-out stage to the external memory at the start of a next region of the output surface.

This can be achieved as desired. It is in an embodiment achieved by configuring the reading of data from the local buffer to the external memory to move (to jump) to the start of the next output surface region that is stored in the local buffer.

In an embodiment, this is done by setting the read position for the next data of the output surface to be read out of the local buffer of the write-out stage for storage in the external memory to the start data position of the data (if any) in the local buffer for the region of the output surface that follows the region of the output surface that was being written to the local buffer when the overrun situation occurred. This then has the effect that the writing out of data from the local buffer to the external memory will jump to the new data for the next region of the output surface being generated. This can be achieved as desired, for example by moving the pointer for the next data read position from the local buffer to the beginning of the region (e.g. line) in question.

This will also have the effect of allowing any data for the "corrupted" region of the output surface that is already stored in the local buffer to, in effect, be immediately "emptied" from the local buffer (as it is no longer to be written out to external memory), and so can therefore further facilitate the rapid freeing up of space for new data in the local buffer.

Correspondingly, in an embodiment, when an overrun situation occurs, any data for the region of the output surface that was being input to the local buffer of the write-out stage when the overrun event occurred that is already present in the local buffer of the write-out stage is, in an embodiment immediately, "emptied" from the local buffer without writing it out to the external memory (and in a manner that would be quicker than writing that data out to external memory).

This is in an embodiment done by, in an embodiment immediately, allowing new input data to overwrite any data for the "corrupted" region that is still present in the local buffer.

In an embodiment, this is done by setting the storage position for the next data of the output surface to be written to the local buffer of the write-out stage to the start data position of the data (if any) in the local buffer for the region of the output surface that was being written to the local buffer when the overrun situation occurred. This then has the effect that the new data for the next region of the output surface being generated can simply overwrite any existing data for the "overrun" region in the local buffer, thereby again facilitating more rapid availability of free space in the local buffer for new output surface data. This can be achieved as desired, for example by moving the pointer for the next data write position in the local buffer to the beginning of the region (e.g. line) in question.

Correspondingly, for any region that is determined to be affected by overrun, some or all of the data for that region will be, and is in an embodiment, simply discarded (lost).

As well as stopping the writing of data to the local buffer, and, in an embodiment, the writing of data for the region in question from the local buffer to the external memory, in an embodiment it is also noted that the writing back of the region in question to external memory was affected by "overrun" (i.e. that the region in question was not correctly and/or completely written to external memory because of an overrun event).

In an embodiment a record is kept for each region that the output surface in question has been divided into, indicating whether or not the output surface region was written to the external memory correctly or not (with that record being updated as output surface regions are written (or not) to external memory accordingly). Such a record may comprise, e.g., a flag for each region of the output surface, which can be set to indicate whether the output surface region was written to the external memory correctly or not, with any output surface regions for which overrun occurred when writing their data to the local memory being flagged as not being written back to external memory correctly.

Thus, in an embodiment, a record, e.g., and in an embodiment in the form of an array or bitmap, is kept, indicating for each region (e.g. line) of the output surface, whether the writing of that region (e.g. line) to the local buffer (and hence to the external memory) was affected by overrun or not (i.e. whether that region (line) of the output surface was written to the external memory correctly or not).

This output surface region data, indicating those output surface regions that have been affected ("corrupted") by overrun, can be maintained and stored in any suitable and desired manner. For example, it may be maintained and stored locally on the display controller, e.g. in appropriate local storage, such as control registers of the display controller. This may be appropriate where the written out output surface is simply to be used again by the display controller (e.g. for displaying the next frame in a sequence of frames).

Additionally or alternatively, the output surface region "corruption" data could be written out to external memory along with the output surface in question (and, e.g., stored in external memory in association with the output surface (e.g. as metadata for the output surface)). As this data may only comprise a single bit per output surface region (e.g. line), it should not add significantly to the storage requirements for the output surface. This may be appropriate where the written out output surface is to be used by some processor other than the display controller.

In an embodiment, a count is also kept of the number of output surface regions that have been affected by overrun (that have been corrupted in the version of the output surface that is stored in external memory due to overrun). This may be in the form of a simple count that is incremented each time an output surface region is affected by overrun.

In an embodiment, if the number of output surface regions (e.g. lines) for a given output surface that are affected by overrun exceeds a particular, in an embodiment selected, in an embodiment predetermined, threshold number of output surface regions, then it is assumed that the output frame as a whole has been irrevocably corrupted by overrun, and so any further writing of the output surface to external memory is stopped (aborted). In an embodiment any data for the output surface that is already present in external memory is also marked as being invalid (is invalidated). This can then be used to avoid re-using an output surface that was excessively affected by overrun when writing it to the external memory.

In an embodiment, the threshold number of output surface regions that can be affected by overrun can be set in use, e.g. by a driver for the display controller (e.g. in response to existing conditions of the overall data processing system, and/or settings in that regard from an application that is requiring the output surface display).

The above discusses the operation when writing an output surface back to external memory. As discussed above, in display controller arrangements where the display controller can write an output surface back to external memory, the reason for such output surface write-back is usually so that the output surface can then be re-used at a later date, e.g. as a single already composited surface for display, or for the purposes of cloning the display onto a second display.

Thus, in an embodiment, the technology described herein further comprises reading the output surface that has been written to external memory using the write-out stage for use (and, in an embodiment, then using the read output surface data).

The read output surface data can be used in these arrangements in any suitable and desired manner. For example, in one embodiment, it is used to display the output surface (the read output surface is displayed). Additionally or alternatively, the read output surface may be transmitted to a remote receiver (e.g. wirelessly), and/or may be encoded (e.g. compressed), e.g., and in an embodiment, for transmission.

In such an arrangement, the output surface stored in the external memory may be read by the same display controller that stored it in the external memory, and/or it may be read by a different, e.g. processor, display controller and/or a video encoder, etc., and/or a different display processing core, e.g. for a second display so as to allow the output surface to be displayed on two (or more) displays simultaneously (e.g. when operating the data processing system in "clone" mode).

The reading operation is in an embodiment performed by the appropriate memory read subsystem of the processor (e.g. controller) that is reading the output surface stored in external memory (thus the input stage of the display controller, where the display controller is reading the output surface stored in the external memory).

In all of these cases, where overrun occurred during the writing of the output surface to external memory, as will be appreciated from the above, the output surface stored in external memory will contain one or more "corrupt" regions (e.g. lines) that were affected by overrun. The technology described herein accordingly extends to mechanisms and processes for taking account of the effect of those "corrupt" regions (e.g. lines) in an output surface that has been written to external memory in the manner of the technology described herein, when re-using the output surface from the external memory.

Thus, in an embodiment, the technology described herein further comprises reading the output surface written to the external memory from the external memory for use, and when reading the output surface from external memory for use, identifying any regions of the output surface that were affected by overrun when writing the output surface to external memory, and for any regions of the output surface that are identified as being affected by overrun when the output surface was being written to the external memory, using other, substitute (replacement) data for those regions of the output surface.

In these arrangements, output surface regions that were affected by overrun when writing the output surface to the external memory can be identified in any suitable and desired manner. This is in an embodiment done using the overrun affected regions tracking information that is recorded as the output surface is being written to external memory (as discussed above). As discussed above, such information may be stored with the output surface in external memory, or may be retained locally on the display controller. In one embodiment, the overrun affected regions tracking information is read in advance of the output frame, to identify in advance those regions of the output frame were affected by overrun.

Any suitable and desired "other" data can be used for a region of the output surface that was affected by overrun when the output surface was written to the external memory. For example, such a region could be replaced with some form of default (e.g. background colour) data.

However, in an embodiment, data from another region of the output surface is used for a region of the output surface that was affected (corrupted) by overrun when the output surface was written to the external memory. In an embodiment data of a previous region of the output surface (in an embodiment of the immediately preceding (uncorrupted) region of the output surface) is used for a region of the output surface that was corrupted by overrun.

Thus, in an embodiment, the data for a previous region (e.g. line) (and in an embodiment for the immediately preceding (uncorrupted) region (e.g. line)) of the output surface is used for a region (e.g. line) of an output surface that was corrupted by overrun when writing the output surface to external memory.

In other words, the technology described herein in an embodiment operates to reuse other data of the output surface that is stored in the external memory in place of data that is "missing" because of overrun when writing the output surface to the external memory.

The Applicants have recognised in this regard that using (e.g. displaying) other data (e.g. another line) of the output surface in place of "missing" data when overrun occurred when writing the output surface to external memory can provide a more visually acceptable and potentially imperceptible correction of the effects of not writing data for a region of the output surface to the external memory when overrun occurs, e.g. when compared to displaying some form of background or default colour, or some other form of error handling.

In particular, the Applicants have recognised that when an image is to be displayed for example, a previous line of a frame is likely to be similar to the next line to be displayed, such that repeating a previous line in the output surface is likely to have less visual impact. This can accordingly provide recovery from display controller overrun with, potentially significantly, reduced impact on the experience of the user viewing the displayed frames.

These arrangements are accordingly able to make overrun, should it occur, in a display controller operation when writing an output surface back to external memory for future use less noticeable to a user. Additionally, because the technology described herein is able to more readily mitigate the effects of overrun, that can allow the display controller and/or memory system correspondingly to be implemented with a (potentially) higher risk of overrun occurring (i.e. reduces the need for imposing constraints on the display controller and memory system design so as to try to avoid overrun), because any overrun that does occur can instead be compensated for by the technology described herein. That will then allow, for example, the display controller and/or overall memory system to be, for example, designed to optimise other parameters such as, efficiency, power consumption and silicon area, instead of being constrained by the need to reduce the risk of overrun to such a large extent.

Thus, in an embodiment the method of the technology described herein comprises (and the display controller (e.g. the input stage of the display controller) is configured to):

for at least one, and in an embodiment for each, region of an output surface that has been written to external memory and that is to be read from the external memory for use, determining whether the writing of that region of the output surface to the external memory was affected by overrun; and when it is determined that a region of the output surface was not (was other than) affected by overrun when writing the output surface to the external memory, reading data for region of the output surface from the external memory for use; but when it is determined that a region of the output surface was affected by overrun when writing the output surface to the external memory, using as data for that region of the output surface, data of another region of the output surface that was not affected by overrun when writing the output surface to the external memory.

The use of data for another region of the output surface for a region of the output surface that was affected by overrun when writing the output surface to external memory can be achieved in any suitable and desired manner. In an embodiment this is achieved by reading in the data for the other region of the output surface as the data to use for the region of the output surface that was affected by overrun. This may be achieved, e.g., and in an embodiment, by pointing the reading process to the data for the region of the output surface that is to be used, so that that data is read in for use for the region of the output surface that was affected by overrun.

In an embodiment, where the output surface that has been written to the external memory is being read by a display controller for use (and in an embodiment by the same display controller as wrote the output surface to the external memory in the first place), the display controller is operable to, and operates to, for a "corrupt" region in the stored output surface, generate the "missing" region of the output surface.

In this case therefore, when a region of the output surface is identified as having been affected by overrun, the display controller is in an embodiment operable to read in data from the relevant input surface or surfaces that should be used to generate the region (e.g. line) of the output surface in question, with the processing stage of the display controller then generating the data for that region of the output surface accordingly. The so-generated data can then be and is in an embodiment used for the region of the output surface in the appropriate manner, e.g. provided to a display for display (e.g. instead of using data from another region of the stored output surface for "corrupt" region).

In an embodiment only (or at least substantially only) the input surface data that is required to generate the region of the output surface in question is read. Correspondingly, in an embodiment only (or at least substantially only) the region of the output surface in question is generated (data for that region is generated).

In an embodiment of these arrangements, the display controller is also operable to write the generated region of the output surface to the stored output surface in external memory (e.g., and in an embodiment, in the manner discussed above). As in this case only a particular region or regions of the output surface will be required to be written to the stored output surface in external memory, it is less likely that any overrun will be encountered when writing the "missing" region or regions in question to the external memory, such that as the output surface in external memory is reused, it should be possible either immediately or progressively to properly "fill in" any missing output surface regions from the initial writing of the output surface to the external memory, such that for subsequent reuses of the stored output surface, a more complete (and ultimately a complete) version of the output surface should be available.

Such operation on the display controller can be configured as desired. For example, a driver for the display controller could instruct the display controller to operate in this manner, and/or the display controller could be operable to internally enable the generation and/or write-back to external memory of the "missing" regions in the output surface.

The "missing" regions of the output surface that should be written out to the stored output surface in the external memory in these arrangements can be identified, as discussed above, from the information indicating which regions of the output surface were affected by overrun when the output surface was initially written to external memory. When a "missing" region of the output surface is written to external memory in these arrangements, then the information indicating which regions of the output surface were affected by overrun is accordingly in an embodiment updated appropriately.

This arrangement can have the effect therefore that even if an output surface initially has a number of regions affected by overrun when it is initially written to external memory, the next time the output surface is used (or over the next few uses of the output surface), any overrun affected regions of the output surface can be properly regenerated and stored in external memory, such that the stored output surface will soon become complete in the external memory.

Thus, in an embodiment, the technology described herein further comprises reading the output surface written to the external memory from the external memory for use, and when reading the output surface from external memory for use, identifying any regions of the output surface that were affected by overrun when writing the output surface to external memory, and for a (and in an embodiment for any) region of the output surface that is identified as having been affected by overrun when the output surface was being written to the external memory, reading (e.g., and in an embodiment, by the input stage) data of an input surface or surfaces to be used to generate the data for the region of the output surface that was identified as being affected by overrun when the output surface was being written to external memory; using (e.g., and in an embodiment, by the processing stage) the read input surface or surfaces data to generate the region of the output surface that was identified as being affected by overrun when the output surface was being written to external memory; and using the generated data for the region of the output surface that was affected by overrun when writing the output surface to the external memory (and in an embodiment outputting that data for display, e.g., and in an embodiment, by the output stage of the display controller); and, in an embodiment, writing the generated region of the output surface (in an embodiment by the write-out stage, in an embodiment in the manner discussed above) to the stored output surface in external memory.

Thus, in an embodiment the method of the technology described herein comprises (and the display controller (e.g. the input stage, etc., of the display controller) is configured to):

for at least one, and in an embodiment for each, region of an output surface that has been written to external memory and that is to be read from the external memory for use, determining whether the writing of that region of the output surface to the external memory was affected by overrun; and when it is determined that a region of the output surface was not (was other than) affected by overrun when writing the output surface to the external memory, reading data for region of the output surface from the external memory for use; but when it is determined that a region of the output surface was affected by overrun when writing the output surface to the external memory:

reading data of an input surface or surfaces to be used to generate the data for the region of the output surface that was identified as being affected by overrun when the output surface was being written to external memory;

using the read input surface or surfaces data to generate the region of the output surface that was identified as being affected by overrun when the output surface was being written to external memory; and using as data for the region of the output surface, the generated data for the region of the output surface that was affected by overrun when writing the output surface to the external memory;

and, in an embodiment, writing the generated region of the output surface to the stored output surface in external memory.

In an embodiment, the display controller of the technology described herein forms part of a data processing system. Thus, another embodiment of the technology described herein comprises a data processing system comprising a display controller that is in accordance with the technology described herein.

The data processing system may and in an embodiment does also comprise one or more of, and in an embodiment all of: a central processing unit, a graphics processing unit, a video processor (codec), a system bus, and a memory controller.

The display controller and/or data processing system may be, and in an embodiment is, configured to communicate with one or more of (and the technology described herein also extends to an arrangement comprising one or more of): an external memory (e.g. via the memory controller), one or more local displays, and/or one or more external displays. The external memory in an embodiment comprises a main memory (e.g. that is shared with the central processing unit (CPU)) of the overall data processing system.

Thus, in some embodiments, the display controller and/or data processing system comprises, and/or is in communication with, one or more memories and/or memory devices that store the data described herein, and/or store software for performing the processes described herein. The display controller and/or data processing system may also be in communication with and/or comprise a host microprocessor, and/or with and/or comprise a display for displaying images based on the data generated by the display controller.

Correspondingly, a further embodiment of the technology described herein comprises a data processing system comprising:

a main memory;

a display;

one or more processing units operable to generate input surfaces for display and to store the input surfaces in the main memory; and a display controller, the display controller comprising:

an input stage operable to read at least one input surface;

a processing stage operable to process one or more read input surfaces to generate an output surface;

an output stage operable to provide an output surface for display to a display; and a write-out stage operable to write an output surface being generated by the processing stage to external memory;

wherein the write-out stage comprises a local buffer operable to receive and store data for an output surface to be written to external memory from the processing stage, and is operable to write data of an output surface to be written to external memory from the local buffer of the write-out stage to external memory;

the display controller further comprising processing circuitry configured to, when the display controller is writing an output surface being generated by the processing stage to external memory using the write-out stage:

determine whether the local buffer of the write-out stage has capacity to receive data of the output surface from the processing stage; and when it is determined that the local buffer of the write-out stage does not have capacity to receive data of the output surface from the processing stage, stop the inputting of data for the output surface to the local buffer of the write-out stage, and re-start the inputting of data of the output surface to the local buffer of the write-out stage at the start of a next region of the output surface.

As will be appreciated by those skilled in the art, these embodiments of the technology described herein can and in an embodiment do include one or more, and in an embodiment all, of the features of the technology described herein described herein.

In use of the display controller and data processing system of the technology described herein, one or more input surfaces will be generated, e.g., and in an embodiment, by a GPU, CPU and/or video codec, etc. and stored in memory. Those input surfaces will then be processed by the display controller to provide an output surface, e.g., and in an embodiment, for display.

The display controller will also store the output surface that it generates in an external memory in the manner discussed above, and as part of that processing determine if overrun occurs, and then operate accordingly.

Once the output surface has been stored in the external memory, then either the display controller or another processor or unit of the data processing system, such as a video codec, GPU or CPU, etc., will read in the output surface that has been stored in external memory by the display controller in the manner discussed above for further use and processing, e.g. for subsequent display and/or otherwise processing it.

The operation in the manner of the technology described herein is in an embodiment repeated for plural output surfaces generated by the display controller, e.g. output frames to be displayed, e.g., and in an embodiment, for a sequence of frames to be displayed.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the display controller can otherwise include any one or more or all of the usual functional units, etc., that display controllers include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

Figure 6:
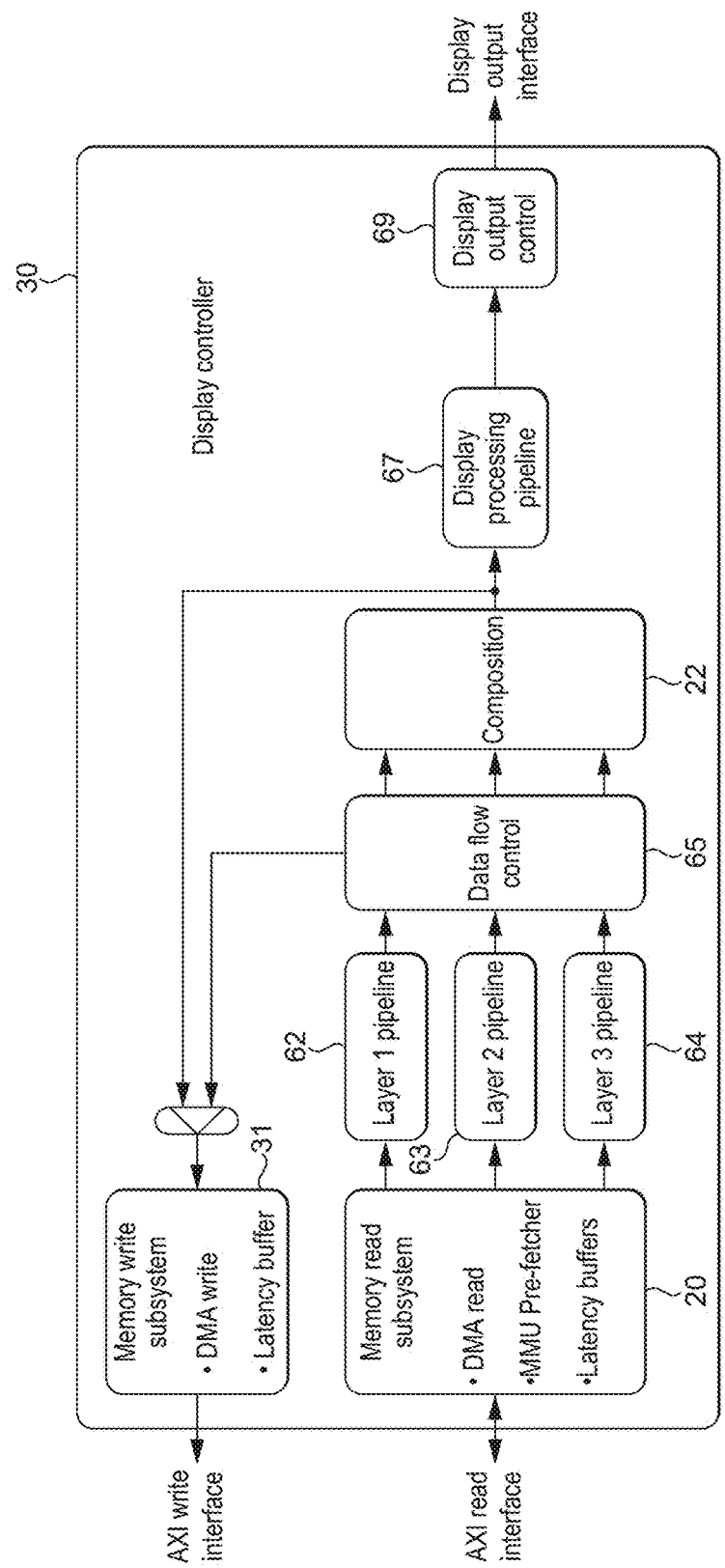
FIG. 6 shows schematically a display controller that can be operated in accordance with an embodiment of the technology described herein.

FIG. 6 shows schematically a display controller 30 that can be operated in accordance with embodiments of the technology described herein. In FIG. 6, the boxes represent functional units of the display controller, while the arrowed lines represent connections between the various functional units. The display controller 30 may be used in a data processing system, e.g. of the form shown in FIG. 1.

As shown in FIG. 6, the display controller 30 comprises a memory read subsystem 20 that includes, inter alia, a read controller in the form of a Direct Memory Access (DMA) read controller. The read controller is configured to read one or more input surfaces from one or more frame buffers in the main memory 3 (not shown in FIG. 6) via the memory bus 9.

The memory read subsystem 20 further comprises one or more real-time FIFO (first-in-first-out) modules which are used to buffer locally the one or more input surfaces as they are read from memory, e.g. for latency hiding purposes.

In this embodiment, the memory read subsystem 20 is configured to provide (read) up to three different input surfaces for use as input layers which are to be used to generate a composited output frame. The three input layers may comprise one or more video layers, e.g. generated by the video processor (codec) 1, and one or more graphics layers, e.g. graphics windows generated by the graphics processing unit (GPU) 2, and so on. Hence, FIG. 6 shows the display controller 30 comprising three layer pipelines 62, 63, 64 which will each receive data from an input surface to be used as a display layer. Any or all of the input surfaces received by the layer pipelines may have been subjected to decoding by a decoder and/or rotation by a rotation unit, if desired.

Each layer pipeline 62, 63, 64 performs appropriate operations on the received surfaces, such as pixel unpacking from the received data words, colour (e.g. YUV to RGB) conversion, and inverse gamma or inverse sRGB correction.

Although the embodiment of FIG. 6 illustrates the use of three layer pipelines (and therefore up to three input layers), it will be appreciated that any number of layer pipelines may be provided and used in the technology described herein, depending on the application in question (and also depending on any silicon area constraints, etc.).

The display controller 30 further comprises a composition unit (display compositor) 22 that can receive inputs from the layer pipelines 62, 63, 64 and operates to compose the received input layers to generate a composited output surface, e.g. by appropriate alpha blending operations, etc.

The layer processing pipelines 62, 63, 64 and the composition unit 22 together act as a processing stage of the display controller 30 that takes data of input surfaces read by the memory read subsystem 20 and produces from that data an output surface, e.g. for display.

The composited output frames from the composition unit 22 are onwardly transmitted to a display processing (post-processing) pipeline 67 for display, and/or to a memory write sub-system 31, as desired.

The display pipeline 67 is configured to selectively carry out any desired processing operation(s) on the composited output surface (frame), and to then transmit the (processed) composited output frame for appropriate display on the associated display.

The display processing pipeline 67 may, for example, comprise a colour conversion stage operable to apply a colour conversion to the composited output frame, a dithering stage operable to apply dithering to the composited output frame, and/or a gamma correction stage operable to carry out gamma correction on the composited output frame.

The display processing pipeline 67 also comprises appropriate display timing functionality. Thus, the display processing pipeline 67 is configured to send pixel data to the display outputs 69 with e.g. appropriate horizontal and vertical blanking periods. For example, horizontal and vertical synchronization pulses (HSYNC, VSYNC) may be generated together with a DATAEN signal which is asserted in non-blanking periods. In blanking periods DATAEN is de-asserted and no data is sent to the display (there are 4 blanking periods: horizontal front porch—before the HSYNC pulse, horizontal back porch—after the HSYNC pulse, vertical front porch—before the VSYNC pulse, and vertical back porch—after the VSYNC pulse).

It would also be possible to use other display timing and data (pixel) packing schemes, such as MIPI DPI, HDMI, Display Port, etc., if desired.

The display output 69 may, e.g. interface with a local display of the data processing system (e.g. of the mobile device, smart phone, tablet, etc., that the data processing system is part of).

The display processing pipeline 67 and display output control interface 69 accordingly act as an output stage for the display controller 30 for providing output surfaces for display to the display 4.

The memory write subsystem 31 of the display controller 30 is operable to write surfaces, e.g. generated by the composition unit 22, and/or from the layer pipelines 62, 63, 64, that it receives, out to external memory 3 (a frame buffer in external memory 3) via a memory bus. This then allows the display controller 30 to, as well as, e.g., providing output frames for display, also write those output frames to main memory, if desired. To facilitate this operation, the memory write subsystem 31 includes a DMA write controller, and comprises appropriate FIFOs to act as a local, latency hiding, buffer.

The display controller 30 also includes a data flow control module 65 that is operable to direct the data flows through the display controller, i.e. to provide the input layers, composited output surfaces, etc., to the appropriate units for processing as shown in FIG. 6. In the present embodiment, the data flow controller 65 operates under appropriate software control, e.g., and in an embodiment, from a driver for the display controller that is running on a host processor (e.g. the CPU 7) of the overall data processing system that the display controller 30 is part of. The driver may generate appropriate commands for the data flow controller 65 and program control registers of the display controller 30 in response to, e.g., commands and data for display processing received from an application running on the host processor.

Other arrangements in this regard, would, of course, be possible.

As discussed above, when the display controller 30 is to provide an output frame for display, it will read in data of one or more input surfaces that have been generated, e.g., by video codec 1 and/or GPU 2, and which are stored in respective frame buffers in the main memory 3, to act as input layers in its output surface generation process, process that input surface data (e.g. by compositing it into an output frame) and provide the (composited) output frame to the display 4 for display via the display processing pipeline 67.

This process is repeated for each frame that needs to be displayed, e.g. at a rate of 30 or 60 frames per second.

As such display processing is a real-time operation, the display controller 30 needs to deliver the pixel data to be displayed to the display 4 (to the display output) regularly, in each clock cycle triggering the display output from the display controller.

As discussed above, the technology described herein and the present embodiments relate to the operation of the display controller shown in FIG. 6 when writing an output surface, e.g. generated by the composition unit 22 or one of the layer pipelines 62, 63, 64, back to external memory using the memory write subsystem 31.

In this operation the, e.g. composition unit 22 will generate pixels of a composited output surface to be displayed at a rate that is governed by the rate at which pixels need to be provided to the display for display. The pixels for the output surface will be generated in the present embodiment in raster order (on a line-by-line basis). As shown in FIG. 6, as well as the pixels being sent to the display processing pipeline for processing for display, the pixels will also be sent (streamed) to the memory write subsystem 31 for writing back to external memory.

Figure 7:
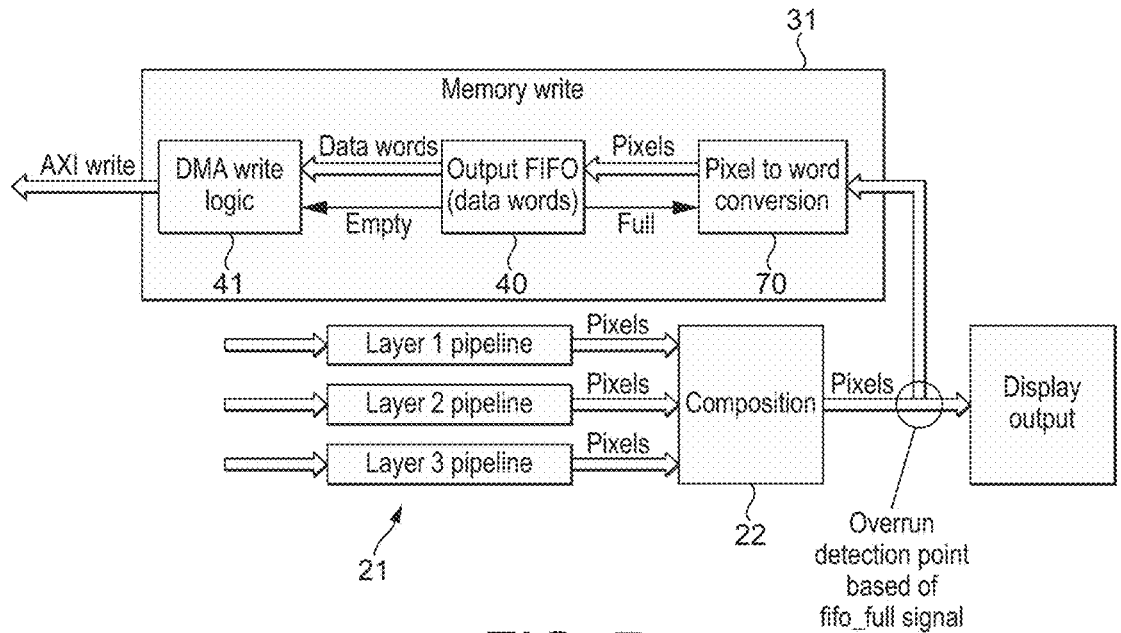
FIGS. 7 and 8 show embodiments of a display controller that can be operated in accordance with an embodiment of the technology described herein.
Figure 8:
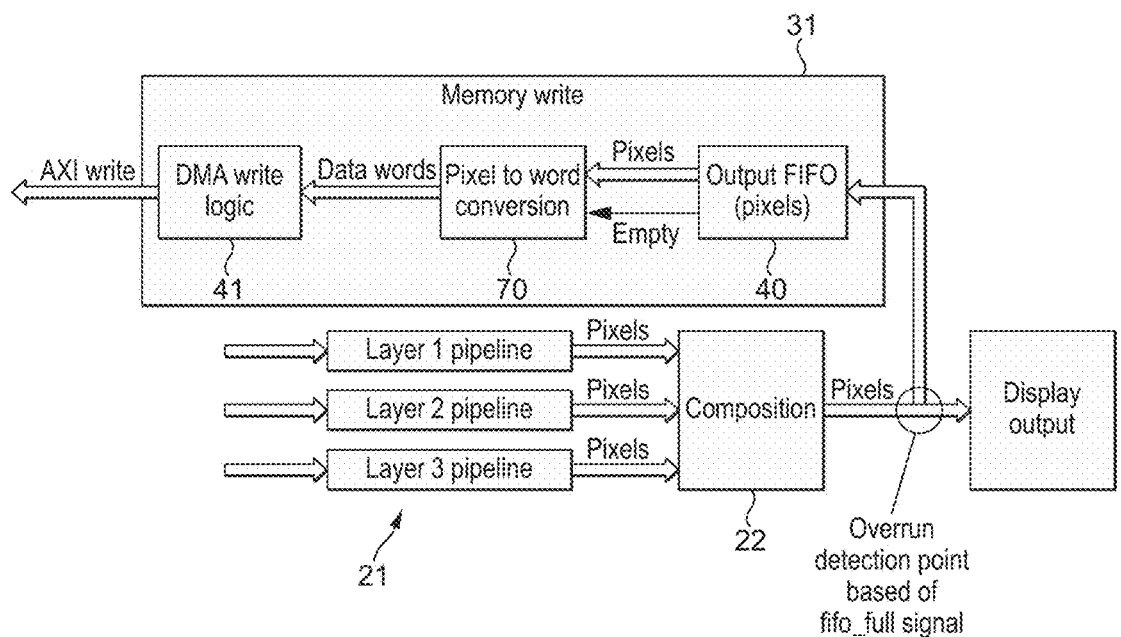

FIGS. 7 and 8 show this operation and the memory write subsystem 31 in more detail.

FIG. 7 shows an arrangement of the memory write subsystem 31 where the local buffer 40 is located in the data path after a pixel-to-word conversion stage 70 and so buffers the output surface data in the form of data words.

FIG. 8 shows another embodiment, in which the local buffer 40 of the memory write subsystem 31 is present in the data path before the pixel-to-word conversion stage 70, and so operates to store the output surface data to be written to external memory in the form of respective pixels (sampling positions) (as pixel (sampling position) data).

(It is assumed in this regard that in the present embodiments, the composition stage 22 outputs its output surface in the form of pixels (sampling positions), but the pixel data is written back to external memory in the form of data words (e.g. each representing a plurality of pixels of the output surface). There is accordingly a need for a pixel-to-data word conversion operation in the memory write-back data path, as shown in FIGS. 7 and 8.)

As shown in FIGS. 7 and 8, the output surface data from the composition stage 22 is received by and stored in the local latency buffer (output FIFO) 40 of the memory write subsystem 31 (either before or after pixel-to-data word conversion) before being written out to the external memory.

The buffered output surface data is then written from the local buffer 40 of the memory write subsystem 31 to the external memory by the DMA write logic (controller) 41 in a linear order, along each line, and for each line, of the output surface in turn (as the lines of the output surface are received in the local buffer 40 from the composition stage 22).

In the present embodiments, the local buffer 40 of the memory write subsystem 31 has capacity to store data from more than a single line of an output surface that is to be written out to external memory (but other arrangements would be possible, if desired).

As discussed above, the technology described herein relates to the operation of the memory write subsystem 31 when writing back of an output surface to external memory in the event that the local, latency hiding buffer 40 of the memory write subsystem 31 becomes full.

As discussed above, the Applicants have recognised that when writing an output surface generated by the composition stage 22 (e.g.) to external memory in the manner shown in FIGS. 7 and 8, the situation can arise when the local, latency hiding buffer 40 of the memory write subsystem 31 is full and has no data capacity for further output surface data from the composition stage 22, even though the composition stage 22 is generating that data. This can be thought of as "overrun" of the local buffer 40, and occurs because the composition stage 22 must generate the pixels for the output surface at a rate that is determined by the display requirements, which rate may not be able always to be matched by the rate at which the output surface data can be written from the local buffer 40 of the memory write subsystem 31 to the external memory.

As shown in FIGS. 7 and 8, the local, latency hiding buffer 40 of the memory write subsystem 31 is configured to signal when it is "full" (i.e. when it has no capacity to receive further data from the composition stage 22).

As shown in FIGS. 7 and 8, when the local buffer 40 signals that it is full, the writing of pixels for the current line of the output surface (that encountered the "overrun") to the local buffer 40 is stopped. The writing of pixels of the output surface to the local buffer 40 is then started again at the beginning of the next line of the output surface 22. Thus the inputting (writing) of output surface data to the local buffer 40 is stopped until the current line of the output surface has been finished, and then started again when the next line of the output surface begins.

In the present embodiments, this is done by the input controller for the local buffer 40 stopping accepting new input data for the line that encountered the overrun and starting to accept data again when the next line starts (it may, e.g., count the dropped line data values to identify when the next line starts).

In addition to this, the writing of any data for the line of the output surface in which overrun was detected (i.e. that encountered the overrun) that is already present in the local buffer 40 and not yet written to the external memory is also skipped (omitted). The writing of data to the external memory from the local buffer 40 is then similarly restarted at the beginning of the next line in the output surface (that did not encounter an overrun event).

Any data for the line of the output surface in which overrun was detected (i.e. that encountered the overrun) that is already present in the local buffer 40 is discarded (in the present embodiments by allowing data for the next line to overwrite that data).

This all has the effect that the "current" line whose writing to the local buffer 40 has been stopped can very quickly be emptied from the local buffer 40, thereby providing capacity in the local buffer 40 for receiving new output surface data.

It is also recorded that the output surface line in question encountered an overrun event (i.e. that the line in question will not be properly stored in external memory (will be "corrupted") because it encountered an overrun event). As will be discussed further below, this allows the corruption of the line in question due to the overrun event to be compensated for when reading the output surface from external memory for use. This information is stored as an array containing an indication (e.g. a one-bit flag) indicating for each line in the output surface, whether that line was corrupted due to overrun during the write-out process or not.

Figure 9:
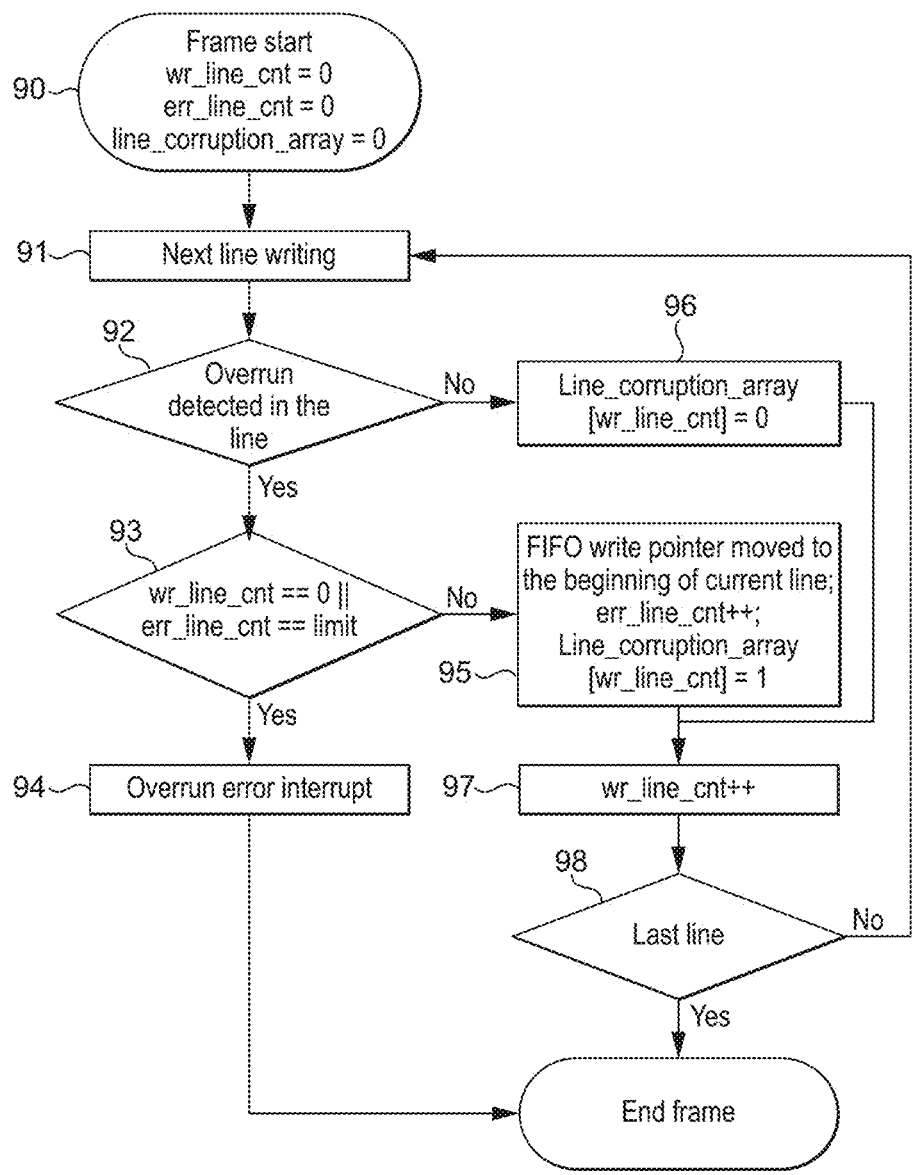
FIG. 9 is a flow chart showing the operation of a display controller in an embodiment of the technology described herein when writing an output surface to external memory.

FIG. 9 shows this operation when writing an output frame (e.g. from the composition stage 22) to external memory in an embodiment of the technology described herein in more detail.

As shown in FIG. 9, the process starts when a new output surface (frame) is to be written to external memory (step 90). At this point, state information for the output surface in question, comprising the current output surface line being written, the number of "error" lines (i.e. lines in which overrun has occurred), and an array storing an indication for each line in the output surface, whether that line encountered overrun (was corrupted) during the write-out process or not, are all initialised, in the present embodiment to zero.

The next line of the output surface is then written to the local buffer 40 of the memory write subsystem 31 (step 91).

If overrun in the local buffer 40 of the memory write subsystem 31 is detected whilst writing the current line to the local buffer 40 (step 92), it is then determined whether the line in which the overrun has been detected is the first line of the output surface or whether the count of the number of lines in which overrun errors have occurred has reached a selected threshold limit (step 93).

If either of these conditions is met, then the writing of the output surface as a whole to the external memory is terminated (step 94). This has the effect of terminating the writing of an output frame to external memory where, for example, the number of corrupted lines in the output frame will be too great (greater than a selected limit), or, in the present embodiment, where the first line of the output surface is corrupted (was subject to overrun). This latter condition may be desirable as there will be no earlier line in the output surface that can be used as a replacement for the (corrupted) first line.

On the other hand, if at step 93 it is determined that the overrun has not occurred in the first line, and that the number of corrupt (overrun) lines has not been reached, then the writing of data for the current line to the local buffer 40 is terminated, and the write pointer for new data to be written into the local buffer 40 of the memory write subsystem 31 from the composition stage 22 is moved to the beginning of the current line being written for which the overrun has been detected. This then has the effect that new output surface data from the composition stage 22 can be immediately written into the local buffer 40 overwriting the data for the line that has been corrupted due to the overrun (step 95).

The count of the number of erroneous (corrupted) lines (i.e. lines that have been subjected to overrun) is also incremented by 1, and a flag is set in the "corrupted lines" array to indicate that the line in question has been corrupted (was subject to overrun) and therefore will not be stored correctly in the external memory (step 95).

On the other hand, if at step 92, no overrun is detected in the line being written, then that line can simply be written to the local buffer and correspondingly to the external memory in the normal manner. In addition, the entry for that line in the corrupted lines array is set to indicate that that line was not corrupted (was not subject to overrun) and so is complete and correct in the stored output surface (step 96).

The process then moves on to the next line for the output surface to be written to external memory (step 97), and is repeated for each line of the output surface until the last line has been processed (step 98).

At this point, the output surface generated by the composition stage will have been stored in external memory, but may include one or more lines of the output surface that encountered overrun when they were being written to the local buffer of the memory write subsystem and so will therefore not be stored correctly (will be corrupted) in the stored version of the output surface that is stored in the external memory. Any such corrupted lines in the stored output surface will be indicated in the corrupted lines array that has been stored for the output surface.

The "corrupted lines" array may be stored in the external memory in association with the output surface, or it may be retained within local storage of the display controller, either with or without also being written out to external memory.

The process can then move on to the next output surface being generated for display, and so on.

Figure 10:
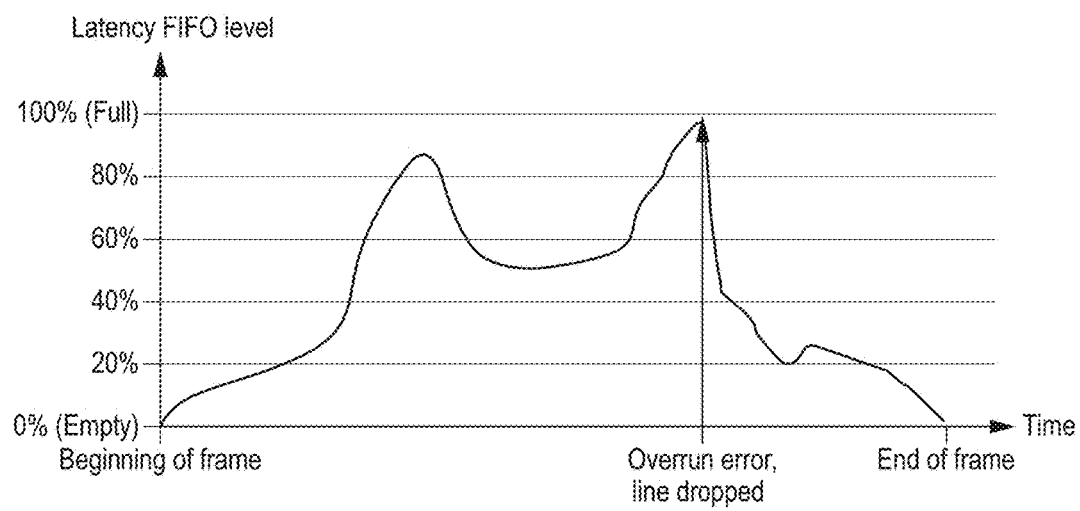
FIG. 10 shows schematically the effect on the capacity of a local buffer when operating a display controller in an embodiment of the technology described herein.

FIG. 10 illustrates the effect on the capacity of the local buffer 40 of the memory write subsystem 31 when operating in the above manner when overrun is detected. As shown in FIG. 10, when the current line being written to the local buffer when overrun is detected is dropped in the manner of the present embodiments, that effectively immediately frees up capacity in the local buffer 40 for receiving further output surface data.

Once the output surface has been stored in the external memory, and the corrupted line array has been stored, then the stored output surface can be used, e.g. in one of the manners discussed above, for example to avoid having to recompose the output surface for a next frame to be displayed, and/or to allow the output surface to be displayed on a second display (when operating the display controller in "clone" mode).

To use the stored output surface, the stored data for that surface will be read from the external memory and, e.g., provided to the display for display or otherwise processed, as discussed above.

In the present embodiments, as part of this processing, it is also identified from the corrupted lines array whether any and which lines of the stored output surface were corrupted due to overrun when storing the output surface in the external memory, and for any such corrupted lines, the data of the previous (uncorrupted) line in the output surface is used (e.g. displayed) instead. This then allows the effect of any corrupted lines in the stored output surface to be compensated for in a relatively straightforward, but still less, e.g., visibly, perceptible manner.

Figure 4:
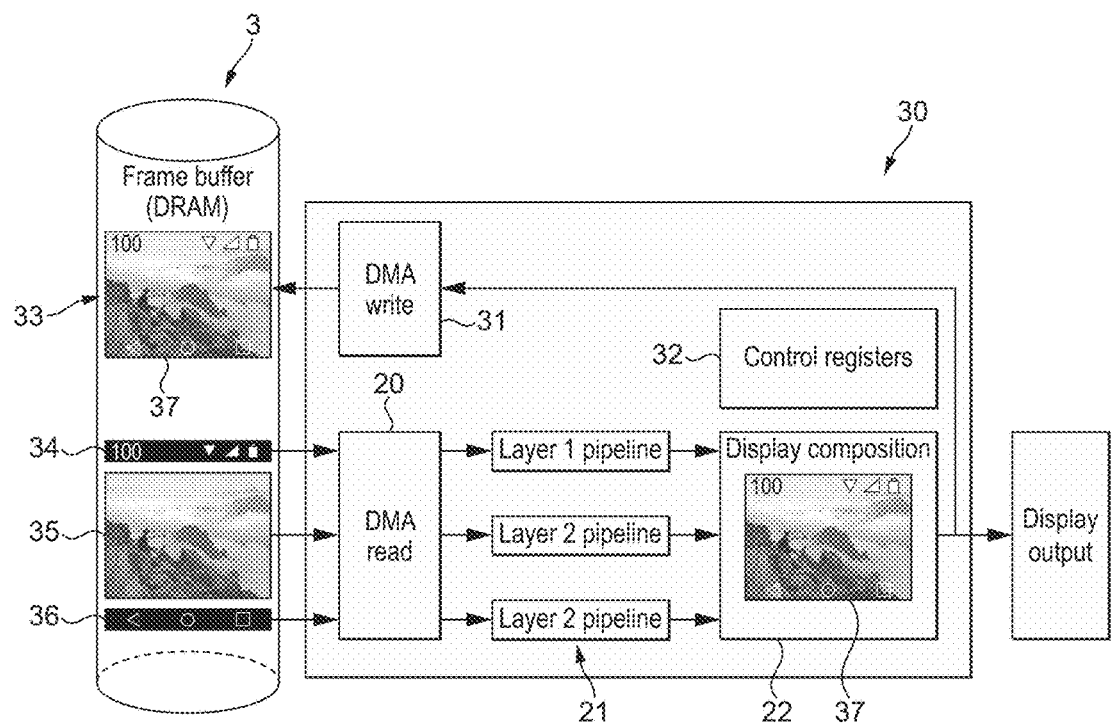
FIGS. 4 and 5 show schematically the operation of a display controller when writing an output surface to external memory for future use.
Figure 5:
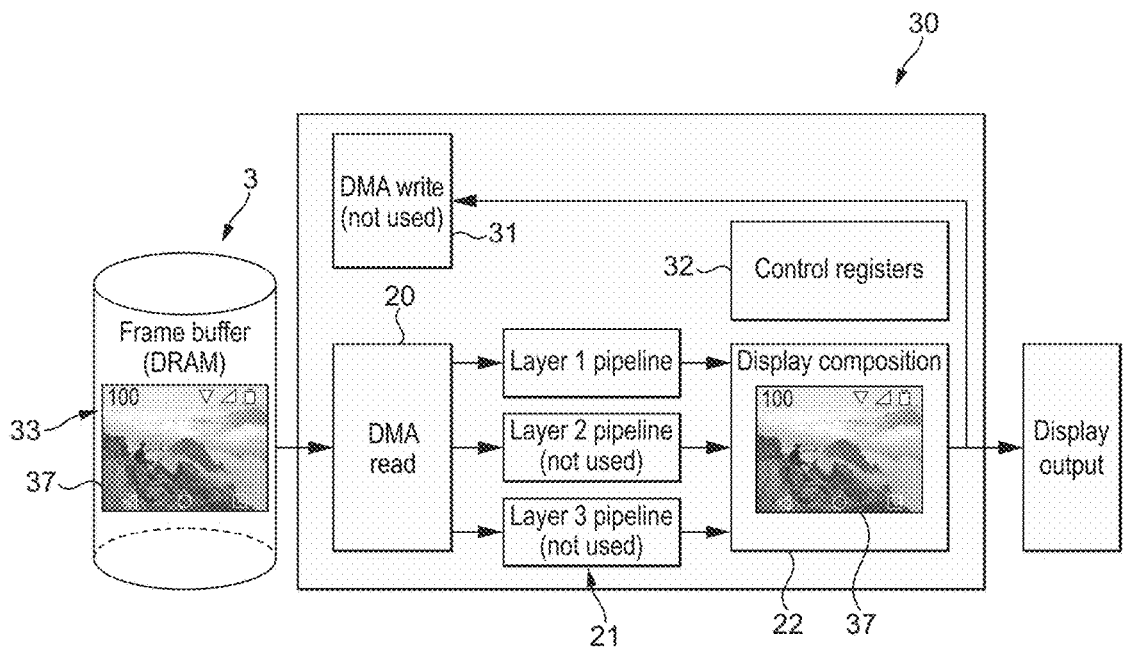
Figure 11:
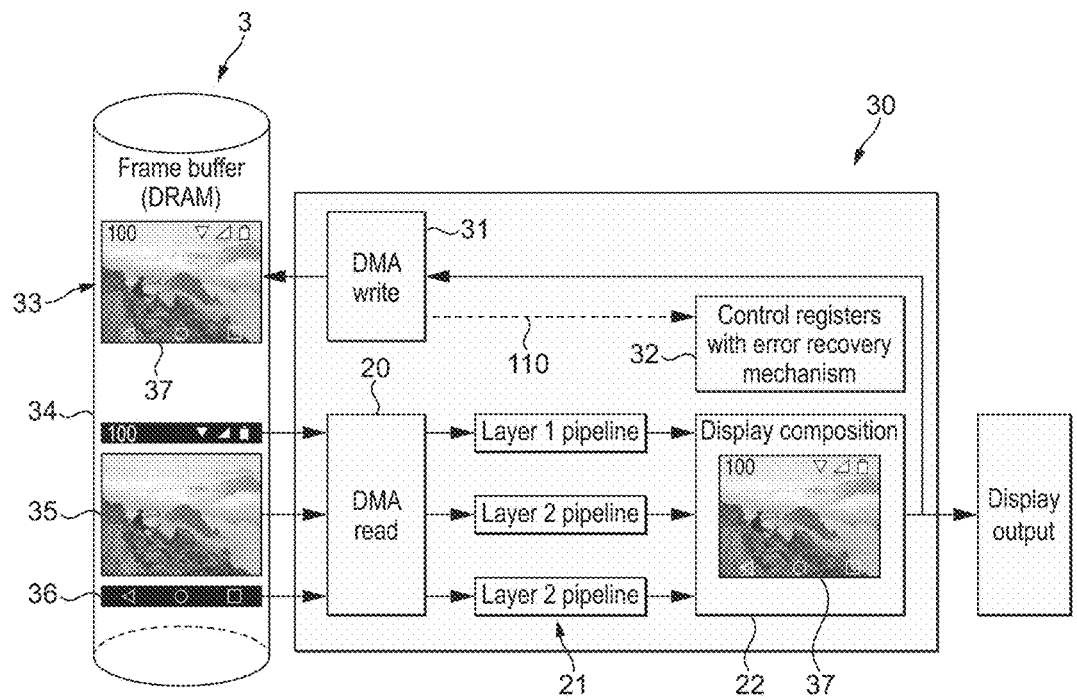
FIGS. 11 and 12 show schematically the operation of a display controller when writing an output surface to external memory for future use and then reading that output surface for use in an embodiment of the technology described herein.
Figure 12:
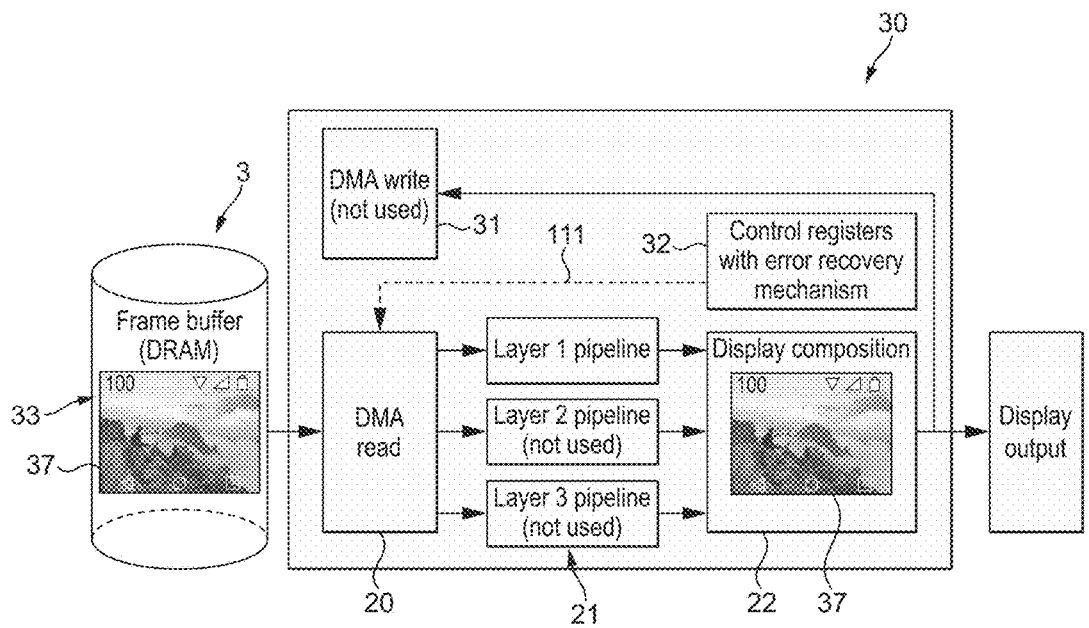

FIGS. 11 and 12 illustrate this operation when using the stored output surface for displaying as a next frame to be displayed in a corresponding manner to the operation described above with reference to FIGS. 4 and 5.

FIG. 11 accordingly illustrates the operation where three input surfaces 34, 35 and 36 are read by the display controller 30 and processed to provide a composited output surface 37, which is both provided for display and written by the memory write-out unit 31 back to the frame buffer 33 in main memory.

In this operation, and in accordance with the present embodiments, and as shown in FIG. 11, as the composited output surface 37 is being written back to the frame buffer 33 in external memory 3 by the memory write subsystem 31, data indicating which lines of the output surface were corrupted by overrun during the memory write-back process is also written 110 to the control registers 32 of the display controller 30.

FIG. 12 then shows the operation for the next frame, in the case where it is determined the frame to be displayed has not changed. In this case, as shown in FIG. 12, the display controller 30 simply reads the stored already composited output surface 37 from the main memory 3 and provides that directly for display.

However, as shown in FIG. 12, and in accordance with the present embodiments, as part of this processing the memory read subsystem 20 of the display controller 30 reads 111 the corrupted lines data stored in the control registers 32 to identify any lines in the stored composited output surface 37 that were corrupted by overrun when the output surface 37 was written back to the external memory. For any such indicated "corrupted" lines, the memory read subsystem 20 operates to read again the data of the closest previous uncorrupted line in the output surface for use as the line of the output surface that was corrupted. The lines of the output surface are then appropriately provided for display via, e.g., the layer 1 pipeline and the display composition stage 22.

Figure 13:
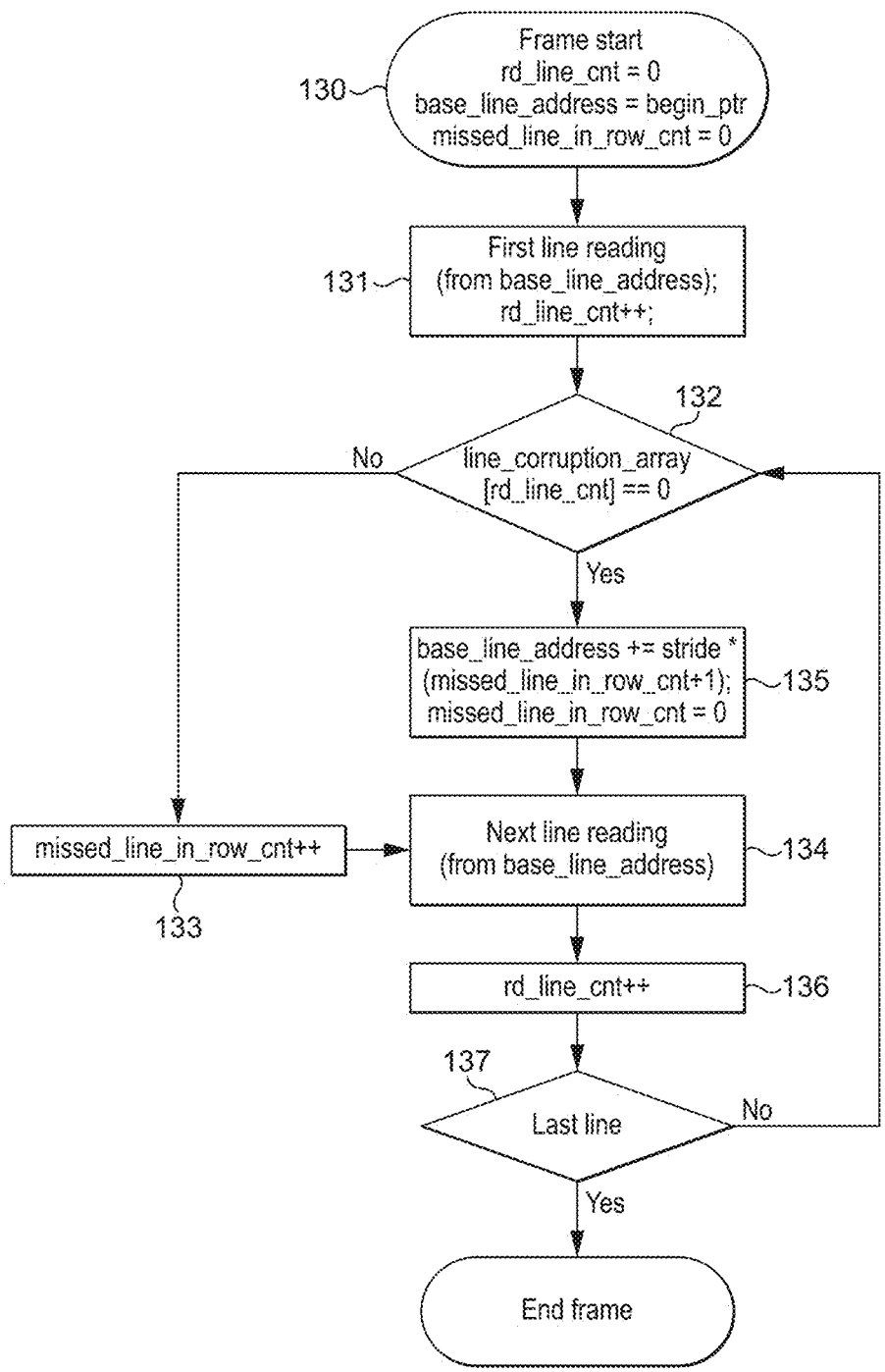
FIG. 13 is a flow chart showing the operation of a display controller in an embodiment of the technology described herein when reading an output surface that has previously been written to external memory.

FIG. 13 shows the operation of the present embodiments when reading a stored output surface (frame) from the external memory for use (e.g. for display as illustrated in FIG. 12) in more detail.

As shown in FIG. 13, the process starts when a new output surface (frame) is to be read from the external memory (step 130). At this point, state information for the output surface in question, comprising the current output surface line being read, the baseline address for where to read the output surface data for the current line from, and a count of the number of corrupted ("missing") lines in a row are all initialised.

As shown in FIG. 13, the current output surface line being read and the number of consecutive missed (corrupted) output surface lines are both initialised to zero. The baseline address for reading the output surface from memory is initialised to the memory address where the data for the stored output surface starts.

The memory read subsystem then reads the first line of the output surface (from the indicated baseline address) (step 131). (As discussed above, it can be assumed in the present embodiments that the first line of the output surface will not be corrupted (because if the first line is found to be affected by overrun, the output surface is not written to external memory at all).) The current output surface line being read is then incremented (step 131) (to the second line).

The memory read subsystem then determines from the "corrupted" lines data, whether the current output surface line being read is corrupt (was affected by overrun or not) (step 132).

If it is determined at step 132 that the current output surface line to be read was corrupted, then the count of consecutive corrupted lines is incremented by 1 (step 133), and data to be used for that (corrupted) line of the output surface is read using the current baseline address (step 134) (and so will correspondingly be read from the immediately preceding non-corrupted line of the output surface).

On the other hand, if at step 132 it is determined that the current output surface line to be read was not corrupted when the output surface was written to the external memory, then the baseline address from which the output surface data for that line of the output surface will be read is incremented appropriately to cause the memory read subsystem 20 to read the data for that uncorrupted line from the stored output surface data in memory (step 135). In this case, the reading of the data for the next line from memory at step 134 will accordingly read the data for the actual output surface line in question from the external memory.

The count of consecutive corrupted lines is also reset to zero (step 135).

The current output surface line to be read is then incremented (step 136) and the process repeated for that line of the output surface, and so on, until the last line of the output surface is reached (step 137).

The effect of this process then is that any uncorrupted lines in the stored output surface are read as themselves, but for any corrupted lines in the stored output surface, the data of the immediately preceding, closest uncorrupted line is read instead.

Various modifications and changes, etc., to the above-described embodiments of the technology described herein would be possible, if desired.

For example, in the above embodiments, the output surface is handled and processed on a line-by-line basis, but it would equally be possible to use other regions, such as blocks of the output surface, for the purposes of processing the output surface in the manner of the present embodiments.

Also, although the embodiments primarily show the stored output surface being read for re-use by the display controller that stored it in the external memory, it could also or instead be read and used by a different component of the data processing system, such as a video codec or another display controller.

It would also correspondingly be possible to use the output surface that has been written to the external memory for other purposes, such as for being cloned to a second display.

Also, where the output surface that has been written to the external memory is being read by a display controller for use (e.g. by the same display controller as wrote the output surface to the external memory in the first place), then the display controller, instead of simply using data from another region of the stored output surface in place of a "corrupt" region in the stored output surface, could be operable to generate the "missing" region of the output surface from the relevant input surface or surfaces that should be used to generate the region (e.g. line) of the output surface in question. The so-generated data can then be used for the region of the output surface in the appropriate manner, e.g. provided to a display for display.

In such arrangements, the display controller is in an embodiment also operable to write the newly generated region of the output surface to the stored output surface in external memory.

This arrangement can have the effect that even if an output surface initially has a number of regions affected by overrun when it is initially written to external memory, the next time the output surface is used (or over the next few uses of the output surface), any overrun affected regions of the output surface can be properly regenerated and stored in external memory, such that the stored output surface will soon become complete in the external memory.

As will be appreciated from the above, the technology described herein, in its embodiments at least, can provide improved mechanisms for dealing with the issue of overrun when writing an output surface back to external memory in display controller operation.

This is achieved, in the embodiments of the technology described herein at least, by stopping the writing of a respective region of the output surface to a local buffer of the memory write subsystem (and subsequently to the external memory) when overrun is detected, but then recommencing the writing of output surface data to the local buffer and to the external memory for a next region of the output surface once the overrun situation has ceased.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a display controller of a data processing system, the display controller comprising:
  input circuitry operable to read at least one input surface;
  processing circuitry operable to process one or more read input surfaces to generate an output surface;
  output circuitry operable to provide an output surface for display to a display; and
  write-out circuitry operable to write an output surface being generated by the processing circuitry to external memory;
  wherein the write-out circuitry comprises a local buffer operable to receive and store data for an output surface to be written to external memory from the processing circuitry, and is operable to write data of an output surface to be written to external memory from the local buffer of the write-out circuitry to external memory;
  the method comprising:
    when writing a region of an output surface being generated by the processing circuitry to external memory using the write-out circuitry, the output surface comprising a plurality of regions:
    determining whether the local buffer of the write-out circuitry has capacity to receive data of the output surface from the processing circuitry; and
    when it is determined that the local buffer of the write-out circuitry does not have capacity to receive data of the output surface from the processing circuitry:
    stopping the inputting of data for the region of the output surface to the local buffer of the write-out circuitry, such that remaining data for the region of the output surface is not written to the local buffer of the write-out circuitry, and re-starting the inputting of data of the output surface to the local buffer of the write-out circuitry at the start of a next region of the same output surface;
  wherein the display controller is a processor of a data processing system, the data processing system also comprises one or more other processors; and the method further comprises:
one of the processors of the data processing system:
reading an output surface that the display controller has written to external memory for use; and
for at least one region of the output surface that has been written to external memory and that is to be read from the external memory for use, determining whether the local buffer of the write-out circuitry did not have capacity to receive data of the output surface from the processing circuitry when sending the data for the region of the output surface to the local buffer; and
when it is not determined for a region of the output surface that the local buffer of the write-out circuitry did not have capacity to receive data of the output surface from the processing circuitry when sending the data for the region of the output surface to the local buffer, reading data for that region of the output surface from the external memory for use; but
when it is determined for a region of the output surface that the local buffer of the write-out circuitry did not have capacity to receive data of the output surface from the processing circuitry when sending the data for the region of the output surface to the local buffer, using as data for that region of the output surface replacement data.

2. The method of claim 1, wherein the output surface is a composited output surface generated by the processing circuitry.

3. The method of claim 1, wherein each region of the output surface corresponds to a line or some fraction of a line of the output surface.

4. The method of claim 1, comprising:
determining that the local buffer of the write-out circuitry does not have capacity to receive data of the output surface from the processing circuitry when the local buffer is full.

5. The method of claim 1, further comprising:
when it is determined that the local buffer of the write-out circuitry does not have capacity to receive data of the output surface from the processing circuitry, not writing any further data for the region of the output surface that was being input to the local buffer of the write-out circuitry when it was determined that the local buffer of the write-out circuitry did not have capacity to receive data of the output surface from the processing circuitry from the local buffer to the external memory, and re-starting the writing of data from the local buffer of the write-out circuitry to the external memory at the start of a next region of the output surface.

6. The method of claim 1, comprising:
storing for each region of the output surface, an indication of whether or not it was determined that the local buffer of the write-out circuitry did not have capacity to receive data of the output surface from the processing circuitry when sending the data for the region of the output surface to the local buffer.

7. The method of claim 1, comprising:
keeping a count of the number of output surface regions for which it was determined that the local buffer of the write-out circuitry did not have capacity to receive data of the output surface from the processing circuitry when sending the data for the region of the output surface to the local buffer; and
when the number of such output surface regions for an output surface exceeds a threshold number of output surface regions, stopping any further writing of the output surface to external memory.

8. The method of claim 1, wherein the processor is the display controller; and wherein
when it is determined for a region of the output surface that the local buffer of the write-out circuitry did not have capacity to receive data of the output surface from the processing circuitry when sending the data for the region of the output surface to the local buffer, using as replacement data for that region of the output surface, data of another region of the output surface for which it was not determined that the local buffer of the write-out circuitry did not have capacity to receive data of the output surface from the processing circuitry when sending the data for the region of the output surface to the local buffer.

9. The method of claim 1, wherein the processor is the display controller; and wherein
when it is determined for a region of the output surface that the local buffer of the write-out circuitry did not have capacity to receive data of the output surface from the processing circuitry when sending the data for the region of the output surface to the local buffer:
reading data of an input surface or surfaces to be used to generate the data for the region of the output surface for which it was determined that the local buffer of the write-out circuitry did not have capacity to receive data of the output surface from the processing circuitry when sending the data for the region of the output surface to the local buffer;
using the read input surface or surfaces data to generate the region of the output surface for which it was determined that the local buffer of the write-out circuitry did not have capacity to receive data of the output surface from the processing circuitry when sending the data for the region of the output surface to the local buffer; and
using as replacement data for the region of the output surface, the generated data for the region of the output surface for which it was determined that the local buffer of the write-out circuitry did not have capacity to receive data of the output surface from the processing circuitry when sending the data for the region of the output surface to the local buffer; and
writing the generated region of the output surface to the stored output surface in external memory.

10. The method of claim 1, wherein the processor is one of the other processors of the data processing system; and wherein
when it is determined for a region of the output surface that the local buffer of the write-out circuitry did not have capacity to receive data of the output surface from the processing circuitry when sending the data for the region of the output surface to the local buffer, using as replacement data for that region of the output surface, data of another region of the output surface for which it was not determined that the local buffer of the write-out circuitry did not have capacity to receive data of the output surface from the processing circuitry when sending the data for the region of the output surface to the local buffer.

11. A display controller for a data processing system, the display controller comprising:
input circuitry operable to read at least one input surface;

input surface processing circuitry operable to process one or more read input surfaces to generate an output surface;

output circuitry operable to provide an output surface for display to a display; and write-out circuitry operable to write an output surface being generated by the processing circuitry to external memory;

wherein the write-out circuitry comprises a local buffer operable to receive and store data for an output surface to be written to external memory from the input surface processing circuitry, and is operable to write data of an output surface to be written to external memory from the local buffer of the write-out circuitry to external memory;

the display controller further comprising processing circuitry configured to, when the display controller is writing a region of an output surface being generated by the input surface processing circuitry to external memory using the write-out circuitry, the output surface comprising a plurality of regions:

determine whether the local buffer of the write-out circuitry has capacity to receive data of the output surface from the input surface processing circuitry; and when it is determined that the local buffer of the write-out circuitry does not have capacity to receive data of the output surface from the input surface processing circuitry:

stop the inputting of data for the region of the output surface to the local buffer of the write-out circuitry, such that remaining data for the region of the output surface is not written to the local buffer of the write-out circuitry, and re-start the inputting of data of the output surface to the local buffer of the write-out circuitry at the start of a next region of the same output surface; and configured to, when the display controller is reading an output surface it has written to external memory using the write out circuitry for use:

for at least one region of the output surface that has been written to external memory and that is to be read from the external memory for use, determine whether the local buffer of the write-out circuitry did not have capacity to receive data of the output surface from the input surface processing circuitry when sending the data for the region of the output surface to the local buffer; and when it is not determined for a region of the output surface that the local buffer of the write-out circuitry did not have capacity to receive data of the output surface from the input surface processing circuitry when sending the data for the region of the output surface to the local buffer, read data for that region of the output surface from the external memory for use; but when it is determined for a region of the output surface that the local buffer of the write-out circuitry did not have capacity to receive data of the output surface from the input surface processing circuitry when sending the data for the region of the output surface to the local buffer, use as data for that region of the output surface replacement data.

12. The display controller of claim 11, wherein the output surface is a composited output surface generated by the input surface processing circuitry.

13. The display controller of claim 11, wherein each region of the output surface corresponds to a line or some fraction of a line of the output surface.

14. The display controller of claim 11, wherein the processing circuitry determines that the local buffer of the write-out circuitry does not have capacity to receive data of the output surface from the input surface processing circuitry when the local buffer is full.

15. The display controller of claim 11, wherein the processing circuitry is further configured to:

when it is determined that the local buffer of the write-out circuitry does not have capacity to receive data of the output surface from the input surface processing circuitry, not write any further data for the region of the output surface that was being input to the local buffer of the write-out circuitry when it was determined that the local buffer of the write-out circuitry did not have capacity to receive data of the output surface from the input surface processing circuitry from the local buffer to the external memory, and re-start the writing of data from the local buffer of the write-out circuitry to the external memory at the start of a next region of the output surface.

16. The display controller of claim 11, wherein the processing circuitry is further configured to:

store for each region of the output surface, an indication of whether or not it was determined that the local buffer of the write-out circuitry did not have capacity to receive data of the output surface from the input surface processing circuitry when sending the data for the region of the output surface to the local buffer.

17. The display controller of claim 11, wherein the processing circuitry is further configured to:

keep a count of the number of output surface regions for which it was determined that the local buffer of the write-out circuitry did not have capacity to receive data of the output surface from the input surface processing circuitry when sending the data for the region of the output surface to the local buffer; and when the number of such output surface regions for an output surface exceeds a threshold number of output surface regions, stop any further writing of the output surface to external memory.

18. The display controller of claim 11, wherein the display controller comprises processing circuitry configured to:

when it is determined for a region of the output surface that the local buffer of the write-out circuitry did not have capacity to receive data of the output surface from the input surface processing circuitry when sending the data for the region of the output surface to the local buffer, use as replacement data for that region of the output surface, data of another region of the output surface for which it was not determined that the local buffer of the write-out circuitry did not have capacity to receive data of the output surface from the input surface processing circuitry when sending the data for the region of the output surface to the local buffer.

19. The display controller of claim 11, wherein the display controller comprises processing circuitry configured to:

when it is not determined for a region of the output surface that the local buffer of the write out circuitry did not have capacity to receive data of the output surface from the input surface processing circuitry when sending the data for the region of the output surface to the local buffer, read data for region of the output surface from the external memory for use; but when it is determined for a region of the output surface that the local buffer of the write-out circuitry did not have capacity to receive data of the output surface from the input surface processing circuitry when sending the data for the region of the output surface to the local buffer:
  read data of an input surface or surfaces to be used to generate the data for the region of the output surface for which it was determined that the local buffer of the write-out circuitry did not have capacity to receive data of the output surface from the input surface processing circuitry when sending the data for the region of the output surface to the local buffer;
  use the read input surface or surfaces data to generate the region of the output surface for which it was determined that the local buffer of the write-out circuitry did not have capacity to receive data of the output surface from the input surface processing circuitry when sending the data for the region of the output surface to the local buffer; and
  use as replacement data for the region of the output surface, the generated data for the region of the output surface for which it was determined that the local buffer of the write-out circuitry did not have capacity to receive data of the output surface from the input surface processing circuitry when sending the data for the region of the output surface to the local buffer; and
  write the generated region of the output surface to the stored output surface in external memory.

20. A data processing system comprising:
a main memory;
a display;
one or more processing units operable to generate input surfaces for display and to store the input surfaces in the main memory; and
a display controller as claimed in claim 11.

21. A computer readable storage medium storing computer software code which when executing on a processor performs a method of operating a display controller of a data processing system, the display controller comprising:
  input circuitry operable to read at least one input surface;
  processing circuitry operable to process one or more read input surfaces to generate an output surface;
  output circuitry operable to provide an output surface for display to a display; and
  write-out circuitry operable to write an output surface being generated by the processing circuitry to external memory;
  wherein the write-out circuitry comprises a local buffer operable to receive and store data for an output surface to be written to external memory from the processing circuitry, and is operable to write data of an output surface to be written to external memory from the local buffer of the write-out circuitry to external memory;
the method comprising:
  when writing a region of an output surface being generated by the processing circuitry to external memory using the write-out circuitry, the output surface comprising a plurality of regions:
  determining whether the local buffer of the write-out circuitry has capacity to receive data of the output surface from the processing circuitry; and
  when it is determined that the local buffer of the write-out circuitry does not have capacity to receive data of the output surface from the processing circuitry:
  stopping the inputting of data for the region of the output surface to the local buffer of the write-out circuitry, such that remaining data for the region of the output surface is not written to the local buffer of the write-out circuitry, and re-starting the inputting of data of the output surface to the local buffer of the write-out circuitry at the start of a next region of the same output surface;
wherein the display controller comprises a processor of the data processing system, the data processing system also comprises one or more other processors; and
the method further comprises:
  one of the processors of the data processing system:
  reading an output surface that the display controller has written to external memory for use; and
  for at least one region of the output surface that has been written to external memory and that is to be read from the external memory for use, determining whether the local buffer of the write-out circuitry did not have capacity to receive data of the output surface from the processing circuitry when sending the data for the region of the output surface to the local buffer; and
  when it is not determined for a region of the output surface that the local buffer of the write-out circuitry did not have capacity to receive data of the output surface from the processing circuitry when sending the data for the region of the output surface to the local buffer, reading data for that region of the output surface from the external memory for use; but
  when it is determined for a region of the output surface that the local buffer of the write-out circuitry did not have capacity to receive data of the output surface from the processing circuitry when sending the data for the region of the output surface to the local buffer, using as data for that region of the output surface replacement data.

* * * * *